US008506694B2

(12) United States Patent
Odell et al.

(10) Patent No.: US 8,506,694 B2
(45) Date of Patent: *Aug. 13, 2013

(54) PHASE SEPARATION INK

(75) Inventors: Peter G. Odell, Mississauga (CA); Rina Carlini, Oakville (CA); Sandra J. Gardner, Oakville (CA); Jennifer L. Belelie, Oakville (CA); Paul McConville, Webster, NY (US); Kentaro Morimitsu, Mississauga (CA); Hadi K. Mahabadi, Mississauga (CA); Stephan V. Drappel, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,043

(22) Filed: Apr. 27, 2011

(65) Prior Publication Data

US 2012/0274713 A1 Nov. 1, 2012

(51) Int. Cl.
*C09D 11/02* (2006.01)
*B41J 2/175* (2006.01)

(52) U.S. Cl.
USPC .......................................... 106/31.13; 347/99

(58) Field of Classification Search
None
See application file for complete search history.

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,490,731 A | 12/1984 | Vaught | |
| 4,532,530 A | 7/1985 | Hawkins | |
| 4,601,777 A | 7/1986 | Hawkins et al. | |
| 5,195,430 A | 3/1993 | Rise | |
| 5,231,135 A | 7/1993 | Machell et al. | |
| 5,372,852 A | 12/1994 | Titterington et al. | |
| 5,389,958 A | 2/1995 | Bui et al. | |
| 5,621,022 A | 4/1997 | Jaeger et al. | |
| 5,698,017 A | 12/1997 | Sacripante et al. | |
| 5,817,169 A * | 10/1998 | Sacripante et al. | 106/31.43 |
| 6,221,137 B1 | 4/2001 | King et al. | |
| 6,472,523 B1 | 10/2002 | Banning et al. | |
| 6,476,219 B1 | 11/2002 | Duff et al. | |
| 6,547,380 B2 | 4/2003 | Smith et al. | |
| 6,576,747 B1 | 6/2003 | Carlini et al. | |

(Continued)

OTHER PUBLICATIONS

Rina Carlini, et al., U.S. Appl. No. 13/095,174, filed Apr. 27, 2011, "Ink Compositions Incorporating Substituted Oxazoline Compounds or Substituted Oxazoline Derivaties," not yet published, 81 pages.

(Continued)

*Primary Examiner* — Yun Qian
(74) *Attorney, Agent, or Firm* — Marylou J. Lavoie

(57) ABSTRACT

A phase separation ink including at least one crystallizable component that crystallizes as it cools from a first ink jetting temperature to a second lower temperature; at least one amorphous component comprising a material that remains amorphous at the second temperature; an optional colorant; wherein the at least one crystallizable component and the at least one amorphous component are in a molten, single phase state at the first ink jetting temperature; wherein at the second temperature, the phase separation ink comprises a crystalline phase comprising the at least one crystallizable component and an amorphous phase comprising the at least one amorphous component; wherein the amorphous phase of the at least one phase separation ink substantially penetrates into the final image receiving substrate and the crystalline phase of the at least one phase separation ink substantially remains on the surface of the final image receiving substrate.

18 Claims, 6 Drawing Sheets

(56) References Cited

U.S. PATENT DOCUMENTS

| | | |
|---|---|---|
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,682,587 B2 | 1/2004 | Hendricks et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |
| 7,084,190 B2 | 8/2006 | Everhardus et al. |
| 7,271,284 B2 | 9/2007 | Toma et al. |
| 7,381,831 B1 | 6/2008 | Banning et al. |
| 7,427,323 B1 | 9/2008 | Birau et al. |
| 2011/0059233 A1 | 3/2011 | Liu et al. |

OTHER PUBLICATIONS

Rina Carlini, et al., U.S. Appl. No. 13/095,221, filed Apr. 27, 2011, "Substituted Oxazoline Compounds or Substituted Oxazoline Derivaties," not yet published, 88 pages.

Kentaro Morimitsu, et al., U.S. Appl. No. 13/095,795, filed Apr. 27, 2011, "Solid Ink Compositions Comprising Amorphous Esters of Citric Acid," not yet published, 28 pages.

Paul McConville, et al., U.S. Appl. No. 13/095,038, filed Apr. 27, 2011, "Print Process for Phase Separation Ink," not yet published, 46 pages.

Naveen Chopra, et al., U.S. Appl. No. 13/095,555, filed Apr. 27, 2011, "Phase Change Inks and Methods of Making the Same," not yet published, 37 pages.

Jennifer L. Belelie, et al., U.S. Appl. No. 13/095,591, filed Apr. 27, 2011, "Phase Change Ink Components and Methods of Making the Same," not yet published, 31 pages.

Kentaro Morimitsu, et al., U.S. Appl. No. 13/095,784, filed Apr. 27, 2011, "Solid Ink Compositions Comprising Amorphous Esters of Tartaric Acid," not yet published, 31 pages.

Kentaro Morimitsu, et al., U.S. Appl. No. 13/095,715, filed Apr. 27, 2011, "Solid Ink Compositions Comprising Crystalline Esters of Tartaric Acid," not yet published, 29 pages.

Kentaro Morimitsu, et al., U.S. Appl. No. 13/095,770, filed Apr. 27, 2011, "Phase Change Inks and Methods of Making the Same," not yet published, 34 pages.

Jennifer L. Belelie, et al., U.S. Appl. No. 13/095,681, filed Apr. 27, 2011, "Solid Ink Compositions Comprising Crystalline-Amorphous Mixtures," not yet published, 31 pages.

Jennifer L. Belelie, et al., U.S. Appl. No. 13/095,636, filed Apr. 27, 2011, "Solid Ink Compositions Comprising Crystalline-Amorphous Mixtures," not yet published, 24 pages.

Kentaro Morimitsu, et al., U.S. Appl. No. 13/095,028, filed Apr. 27, 2011, "Phase Change Ink," not yet published, 39 pages.

Thomas Edward Enright, et al., U.S. Appl. No. 13/095,015, filed Apr. 27, 2011, "Solventless Reaction Process," not yet published, 34 pages.

Marcel Slot, "Oce Printhead and CrystalPoint™ Technology,", 16th Annual European Inkjet Conference, Nov. 13, 2008, 49 pages.

* cited by examiner

PHASE SEPARATION INK

RELATED APPLICATIONS

Commonly assigned U.S. patent application Ser. No. 13/095,174, entitled "Next-Generation Solid Inks From Novel Oxazoline Components, Developed for Robust Direct-to-Paper Printing", filed concurrently herewith, is hereby incorporated by reference herein in its entirety.

Commonly assigned U.S. patent application Ser. No. 13/095,221, entitled "Oxazoline Derivatives: Novel Components for a Next-Generation Robust Solid Ink", filed concurrently herewith, is hereby incorporated by reference herein in its entirety.

Commonly assigned U.S. patent application Ser. No. 13/095,795, entitled "Solid Ink Compositions Comprising Amorphous Esters of Citric Acid", filed concurrently herewith, is hereby incorporated by reference herein in its entirety.

Commonly assigned U.S. patent application Ser. No. 13/095,038, entitled "Print Process For Phase Separation Ink", filed concurrently herewith, is hereby incorporated by reference herein in its entirety.

Commonly assigned U.S. patent application Ser. No. 13/095,555, entitled "Phase Change Inks and Methods of Making the Same", filed concurrently herewith, is hereby incorporated by reference herein in its entirety.

Commonly assigned U.S. patent application Ser. No. 13/095,591, entitled "Phase Change Ink Components and Methods of Making the Same", filed concurrently herewith, is hereby incorporated by reference herein in its entirety.

Commonly assigned U.S. patent application Ser. No. 13/095,784, entitled "Solid Ink Compositions Comprising Amorphous Esters of Tartaric Acid", filed concurrently herewith, is hereby incorporated by reference herein in its entirety.

Commonly assigned U.S. patent application Ser. No. 13/095,715, entitled "Solid Ink Compositions Comprising Crystalline Esters of Tartaric Acid", filed concurrently herewith, is hereby incorporated by reference herein in its entirety.

Commonly assigned U.S. patent application Ser. No. 13/095,770, entitled "Phase Change Inks and Methods of Making the Same", filed concurrently herewith, is hereby incorporated by reference herein in its entirety.

Commonly assigned U.S. patent application Ser. No. 13/095,681, entitled "Solid Ink Compositions Comprising Crystalline-Amorphous Mixtures", filed concurrently herewith, is hereby incorporated by reference herein in its entirety.

Commonly assigned U.S. patent application Ser. No. 13/095,636, entitled "Solid Ink Compositions Comprising Crystalline-Amorphous Mixtures", filed concurrently herewith, is hereby incorporated by reference herein in its entirety.

Commonly assigned U.S. patent application Ser. No. 13/095,015, entitled "Solventless Reaction Process", filed concurrently herewith, is hereby incorporated by reference herein in its entirety.

BACKGROUND

Disclosed herein is a phase separation ink comprising at least one crystallizable component comprising a material that crystallizes as it cools from a first ink jetting temperature to a second temperature that is lower than the ink jetting temperature, wherein the second temperature is sufficient to initiate crystallization of the at least one crystallizable component; at least one amorphous component comprising a material that remains amorphous at the second temperature; an optional colorant; wherein the at least one crystallizable component and the at least one amorphous component are in a molten, single phase state at the first ink jetting temperature; wherein at the second temperature, the phase separation ink comprises a crystalline phase comprising the at least one crystallizable component and an amorphous phase comprising the at least one amorphous component; wherein the amorphous phase of the at least one phase separation ink substantially penetrates into the final image receiving substrate; and wherein the crystalline phase of the at least one phase separation ink substantially remains on the surface of the final image receiving substrate.

Ink jetting devices are known in the art, and thus extensive description of such devices is not required herein. As described in U.S. Pat. No. 6,547,380, which is hereby incorporated by reference herein in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing wherein an acoustic beam exerts a radiation pressure against objects upon which it impinges. Thus, when an acoustic beam impinges on a free surface such as at the liquid/air interface of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change or solid inks printing directly on a substrate or on an intermediate transfer member, such as the one described in U.S. Pat. No. 5,372,852, which is hereby incorporated by reference herein in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby totally incorporated herein.

As noted, ink jet printing processes may employ inks that are solid at room temperature and liquid at elevated temperatures. Such inks may be referred to as hot melt inks or phase change inks. For example, U.S. Pat. No. 4,490,731, which is hereby incorporated by reference herein in its entirety, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

Solid inks for piezoelectric ink jet printing have been designed to successfully print in a transfix mode wherein the ink is jetted onto an intermediate transfer drum. In the transfix printing process, the ink cools from the jetting temperature (broadly, from about 75° C. and to no higher than about 180° C., and typically from about 110° C. to about 140° C.) to the drum temperature (typically from about 50° C. to about 60° C.), and, subsequently, as a substantially solid phase, the ink is pressed into a paper substrate. Such a process provides a number of advantages including vivid images, economy of jet use, and substrate latitude among porous papers. However, such ink designs can present problems when applied to coated papers. In general, the ink and the print process can fail to provide sufficient image durability in response to paper handling stresses such as scratch, fold and rub stresses. Moreover, key elements of the ink design that provide good transfix behavior may not be required or desired in a direct to paper architecture.

Currently available phase change or solid ink printing processes are suitable for their intended purposes. However, a need remains for a printing process and phase change ink providing improved properties including improved adherence of image to paper, improved image permanence, improved robustness against mechanical stresses, and improved image characteristics including surface gloss level. Further, a need remains for a direct to paper printing process for phase separation inks.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase separation ink comprising at least one crystallizable component comprising a material that crystallizes as it cools from a first ink jetting temperature to a second temperature that is lower than the ink jetting temperature, wherein the second temperature is sufficient to initiate crystallization of the at least one crystallizable component; at least one amorphous component comprising a material that remains amorphous at the second temperature; and an optional colorant; wherein the at least one crystallizable component and the at least one amorphous component are in a molten, single phase state at the first ink jetting temperature; wherein at the second temperature, the phase separation ink comprises a crystalline phase comprising the at least one crystallizable component and an amorphous phase comprising the at least one amorphous component; wherein the amorphous phase of the at least one phase separation ink substantially penetrates into the final image receiving substrate; and wherein the crystalline phase of the at least one phase separation ink substantially remains on the surface of the final image receiving substrate.

Also described is a process which comprises (1) incorporating into an ink jet printing apparatus a phase change ink comprising at least one crystallizable component comprising a material that crystallizes as it cools from a first ink jetting temperature to a second temperature that is lower than the ink jetting temperature, wherein the second temperature is sufficient to initiate crystallization of the at least one crystallizable component; at least one amorphous component comprising a material that remains amorphous at the second temperature; and an optional colorant; wherein the at least one crystallizable component and the at least one amorphous component are in a molten, single phase state at the first ink jetting temperature; wherein at the second temperature, the phase separation ink comprises a crystalline phase comprising the at least one crystallizable component and an amorphous phase comprising the at least one amorphous component; wherein the amorphous phase of the at least one phase separation ink substantially penetrates into the final image receiving substrate; and wherein the crystalline phase of the at least one phase separation ink substantially remains on the surface of the final image receiving substrate; (2) melting the ink; (3) causing droplets of the melted ink to be ejected in an imagewise pattern onto an intermediate transfer member or directly onto the final image receiving substrate; and (4) optionally, if an intermediate transfer member is used, transferring the image to the final image receiving substrate.

DETAILED DESCRIPTION

Figure 1:
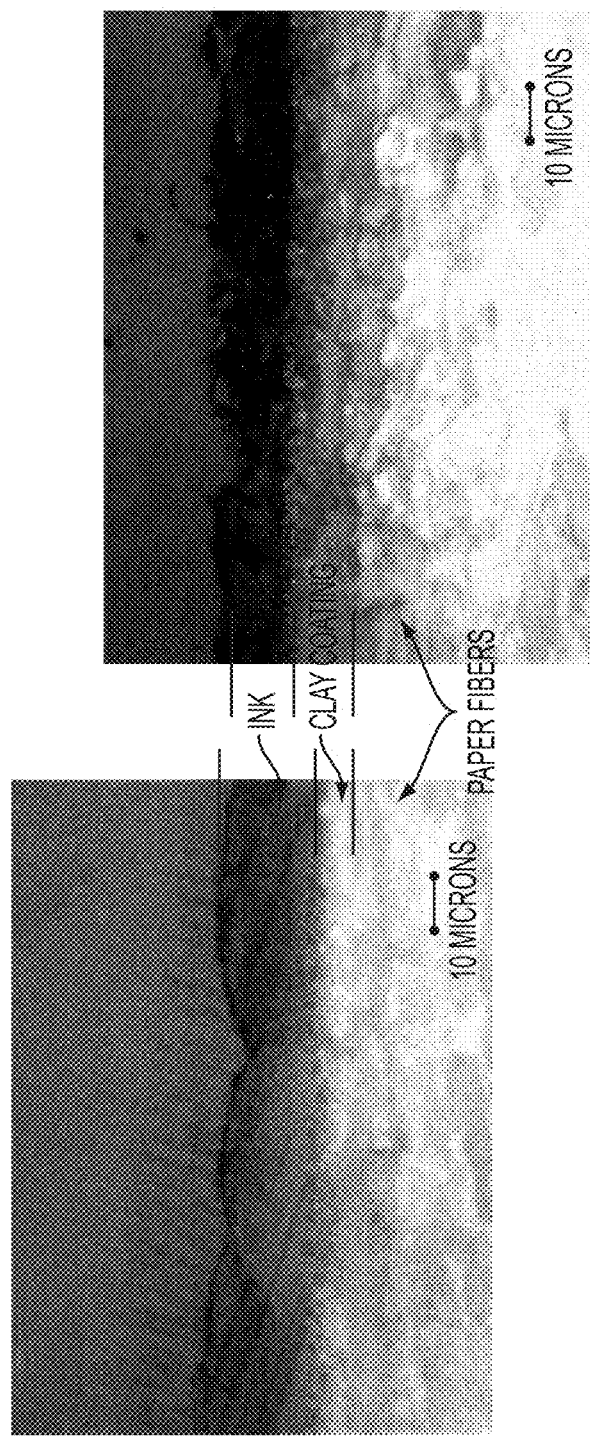
FIG. 1 is a photomicrograph showing a cross-sectional comparative print (left picture) versus a print in accordance with the present disclosure (right picture).

A phase separation ink is described comprising at least one crystallizable component comprising a material that crystallizes as it cools from a first ink jetting temperature to a second temperature that is lower than the ink jetting temperature, wherein the second temperature is sufficient to initiate crystallization of the at least one crystallizable component; at least one amorphous component comprising a material that remains amorphous at the second temperature; and an optional colorant; wherein the at least one crystallizable component and the at least one amorphous component are in a molten, single phase state at the first ink jetting temperature, in embodiments, the first ink jetting temperature being from about 100° C. to about 140° C.; wherein at the second temperature, in embodiments, the second temperature being from about 20° C. to about 120° C., about 60° C. to about 120° C., about 20° C. to about 100° C., about 20° C. to about 80° C., the phase separation ink comprises a crystalline phase comprising the at least one crystallizable component and an amorphous phase comprising the at least one amorphous component; wherein the amorphous phase of the at least one phase separation ink substantially penetrates into the final image receiving substrate; and wherein the crystalline phase of the at least one phase separation ink substantially remains on the surface of the final image receiving substrate.

In embodiments, the crystallizable component herein rapidly crystallizes as it cools from ink jetting temperature while the amorphous component remains amorphous and mobile despite increasing viscosity as it cools from ink jetting temperature.

The morphology of the ink image on paper can play a large role in determining the robustness of the image. For instance, an ink that soaks deep into the paper may approach the robustness of the paper itself as it cannot be damaged without damage to the paper itself. However, such an ink will have very noticeable and objectionable image show-through on the reverse side of the paper. The phase separation ink of the present disclosure has properties that provide partial ink penetration into coated papers. In embodiments, partial ink penetration is accomplished by ink soaking into the thin coating at the paper surface. The coating in most papers consists of calcium carbonate and/or kaolin clay with a small amount of polymer binder. The phase separation inks herein have ink material properties that favor this penetration-into-paper-coating behavior. That is, in embodiments, the present phase separation ink compositions provide penetration into the paper coating but not into the paper fibers.

In embodiments, the ink thickness of the crystalline phase at the surface of the image receiving substrate is about 10 micrometers. In embodiments, the amorphous phase of the ink penetrates into the top coat of the final image receiving substrate to a maximum depth of about 10 micrometers.

The phase separation ink herein can comprise a single phase at jetting temperature and, upon cooling, can comprise two phases wherein one phase is crystalline and one phase is amorphous, wherein the crystalline phase and has a substantially lower mobility than the separate amorphous phase, and wherein the amorphous phase can penetrate into the image receiving substrate, in embodiments within a top coat layer of a coated paper substrate, while the crystalline phase remains substantially or completely on the top layer without penetration. It has been surprisingly discovered that it is not the viscosity difference between the crystalline and amorphous components of the ink that drives the phase separation, but rather the rapid crystallization of the crystalline phase change component, which dictates the depth of penetration of the still mobile amorphous component into the paper coating and paper fibers. As a result, the image surface has enhanced content of crystalline material and the ink portion that penetrates the paper coating is more amorphous. Further, it has been found that the colorant favors the more amorphous phase. In embodiments, the colorant displays a greater affinity for the amorphous phase than for the crystalline phase such that the colorant substantially penetrates into the final image receiving substrate along with the amorphous phase. In certain embodiments, the crystallization of the at least one crystallizable component forces the colorant into the amorphous phase.

The present phase separation ink can be used for any suitable or desired printing application. In embodiments, the process can be a direct printing process wherein one or more phase separation inks are disposed directly onto a final image receiving substrate. In embodiments, the final image receiving substrate is paper. In a direct to paper (DTP) ink jet printing architecture, the ink impacts the paper at essentially the same temperature as the jetting temperature (wherein jetting temperature is typically from about 100° C. to about 140° C.). As the ink cools from the jetting temperature, the ink herein can phase separate wherein one ink component rapidly crystallizes, while another ink component is in an amorphous state. The amorphous phase continues to penetrate into the paper coating and may carry much of the colorant with it. In this process, the upper layer of crystalline material can act as a less color intensive protective coating that increases resistance of the image to mechanical damage. In embodiments, the phase separation ink materials herein do not penetrate the paper beyond the coating layer (a penetration depth of about 10 micrometers) and thus do not display print through or show through defects. In embodiments, the crystalline phase of the at least one phase separation ink substantially remains on the surface of the final image receiving substrate providing a protective coating thereon.

The phase separation ink herein comprises an ink that is in a molten, unseparated state, that is, a melted, liquid, single phase, at a first temperature corresponding to a disposing or ink jetting temperature, and that is in a multiple phase state at a second temperature, wherein the second temperature is sufficient to initiate crystallization of at least one component of the phase separation ink, and wherein at the second temperature the phase separation ink comprises a crystalline phase and an amorphous phase. That is, the phase separation ink can comprise at least one component that crystallizes at the second temperature and at least one component that is amorphous at the second temperature.

As used herein, a crystalline component or crystallizable component means a solid material whose constituent atoms, molecules, or ions are arranged in an orderly repeating pattern extending in all three spatial dimensions. In embodiments, the crystalline materials of the present disclosure exhibit melting and crystallization peaks by differential scanning calorimetry, DSC, 10° C./minute, of from about −50° C. to about 200° C. to about −50° C.).

As used herein, amorphous component means a solid material which does not exhibit crystalline structure. That is, while there may be local ordering of the atoms or molecules, there is no long-term ordering thereof. In embodiments, the amorphous materials of the present disclosure have $T_g$s (glass transition temperatures) but do not exhibit crystallization and melting peaks by DSC, 10° C./minute, of from about −50° C. to about 200° C. to about −50° C.).

The crystalline component selected for embodiments herein can be any suitable or desired crystalline component having the desired characteristics and which is miscible with the selected amorphous component. The crystalline component can have any suitable or desired melting temperature. In embodiments, the crystalline component herein has a melt temperature of from about 40° C. to about 150° C., from about 50° C. to about 145° C., or from about 55° C. to about 140° C. In a specific embodiment, the at least one crystalline component herein has a melting temperature of less than about 150° C., as determined by Differential Scanning calorimetry at a rate of 10° C./minute.

The crystalline component can have any suitable or desired crystallization temperature. In embodiments, the crystalline component has a recrystallization temperature of from about 30° C. to about 135° C., or from about 30° C. to about 110° C., or from about 30° C. to about 100° C.

In embodiments, the at least one crystallizable component has a viscosity of about 1 centipoise (cps) to about 22 cps, or about 2 cps to about 15 cps, or about 2 cps to about 11 cps at a temperature of about 100° C. to about 140° C. In specific embodiments, the at least one crystallizable component has a viscosity of about 2 to about 50 centipoise at a temperature of above about 110° C. In one specific embodiment, the at least one crystallizable component has a viscosity of about 2 to about 50 centipoise at a temperature of about 140° C.

Any suitable or desired material having the required properties can be selected for the crystallizable component herein. In certain embodiments, the crystallizable component can be selected from the group consisting of esters, aromatic amides, aromatic ethers, diurethanes, oxazolines, and mixtures and combinations thereof. Examples of suitable crystalline or crystallizable components are illustrated in Table 1.

TABLE 1

| Compound | Structure | $T_{melt}$ (° C.)* | $T_{crys}$ (° C.)* | η @ 140° C. (cps)** | η @ RT (cps)** |
|---|---|---|---|---|---|
| 1 | (phenethyl tartrate diester structure) | 110 | 83 | 4.7 | >10$^6$ |
| 2 | (phenylacetamide structure) | 98 | 71 | 2.9 | >10$^6$ |
| 3 | (bis(4-methoxyphenyl) pimelate structure) | 119 | 80 | 3.3 | >10$^6$ |
| 4 | (bis(4-methoxyphenyl) adipate structure) | 125 | 75 | 3.0 | >10$^6$ |

*The samples were measured on a Q1000 Differential Scanning Calorimeter (TA Instruments) at a rate of 10° C./minute from −50° C. to 200° C. to −50° C.; using a heat/cool/heat method. Midpoint values are quoted.
**The viscosities were measured on an ARES fluids rheometer RFS3 (TA instruments) equipped with a Peltier heating plate and using a 25 millimeter parallel plate. The method used was a temperature sweep from high to low temperatures, in temperature decrements of 5° C., a soak (equilibration) time of 120 seconds between each temperature and at a constant frequency of 1 Hz.

component has a crystallization temperature of from about 30° C. to about 140° C., from about 31° C. to about 125° C., or from about 32° C. to about 120° C., as determined by Differential Scanning calorimetry at a rate of 10° C./minute. In other embodiments, the at least one crystalline component herein has a crystallization temperature of greater than about 65° C. to less than about 140° C.

The crystallizable component may have its crystallization temperature lowered by various factors such as the presence of other materials in the ink or by the paper or print process environment. In embodiments, the at least one crystallizable In embodiments, the crystalline component can be crystalline aromatic monoesters or aromatic amides described in commonly assigned, co-pending U.S. patent application Ser. No. 13/095,028, which is hereby incorporated by reference herein in its entirety, crystalline diesters described in commonly assigned, co-pending U.S. patent application Ser. No. 13/095,555, which is hereby incorporated by reference herein in its entirety, crystalline esters of tartaric acid as described in co-pending, commonly assigned U.S. patent application Ser. No. 13/095,715, which is hereby incorporated by reference herein in its entirety, crystalline aromatic amides described in commonly assigned, co-pending U.S. patent application Ser. No. 13/095,770, which is hereby incorporated by reference herein in its entirety, and crystalline oxazoline compounds described in commonly assigned, co-pending U.S. patent application Ser. No. 13/095,174, which is hereby incorporated by reference herein in its entirety, and U.S. patent application Ser. No. 13/095,221, which is hereby incorporated by reference herein in its entirety.

The crystalline component can be prepared by any suitable or desired method. For example, the crystalline component can be prepared by an esterification or amidation reaction between a compound having a hydroxyl or amino group and a compound having a carboxylic acid group or an acid chloride group. Crystalline components are also commercially available, such as from TCI America.

In embodiments, the crystalline component can be selected from substituted oxazoline compounds or derivatives, as described in commonly assigned, co-pending U.S. patent application Ser. No. 13/095,221, and U.S. patent application Ser. No. 13/095,174, incorporated by reference hereinabove, which is represented by the general structure

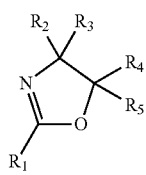

(I)

wherein $R_1$ is an alkyl group of from about 1 to about 60 carbon atoms, $R_2$, $R_3$, $R_4$, and $R_5$ are the same or different and are groups having from about 1 to about 60 carbons, or from about 2 to about 55 carbons, a hydroxyalkyl group having from about 1 to about 60 carbons, or from about 2 to about 55 carbons, or an alkyl ester group having from about 1 to about 60 carbons, or from about 2 to about 55 carbons; for example, $R_2$, $R_3$, $R_4$, and $R_5$ may be a hydroxyalkyl group $-(CH_2)_n-OH$, wherein n is an integer of from about 1 to about 60, or from about 2 to about 55, or $R_2$, $R_3$, $R_4$, and $R_5$ may be an alkyl ester group $-(CH_2)_n-O_2C-(CH_2)_mCH_3$, wherein n is an integer of from about 1 to about 7, or from about 2 to about 5, and m is an integer of from about 1 to about 60.

In other embodiments, group $R_1$ may be an alkyl group, aryl group, alkylaryl group, or aromatic group (each of which may or may not be substituted), such as an alkyl group containing from about 1 to about 60 carbon atoms, such as from about 5 to about 36 carbon atoms, or from about 5 to about 25 carbon atoms, or an aryl group, alkylaryl group, aromatic group containing from about 5 to about 20 carbon atoms, such as from about 6 to about 18 carbon atoms, or from about 7 to about 14 carbon atoms, or an aromatic group, such as, for example, an aromatic group of having the structure

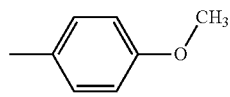

and wherein $R_2$, $R_3$, $R_4$, and $R_5$ are the same or different and are independently selected from hydrogen, halogens such as F, Cl, Br, I, an alkyl group, aryl group, alkylaryl group, or aromatic group (each of which may or may not be substituted) as defined for $R_1$, including, for example, a linear or branched alkyl group of from about 1 to about 60 carbon atoms, a linear or branched hydroxylalkyl group of from about 1 to about 60 carbon atoms, a linear or branched alkyl ester group of from about 1 to about 60 carbon atoms, an aryl ester group, a cyclic alkyl group of from about 3 to about 60 carbon atoms, a cyclic alkyl alcohol group of from about 3 to about 60 carbon atoms, a cyclic alkyl ester group of from about 3 to about 60 carbon atoms, wherein at least one of $R_1$, $R_2$, $R_3$, $R_4$, and $R_5$ is an aromatic group, which may or may not be a substituted aromatic group.

In embodiments, the oxazoline compounds and derivatives may be prepared by a condensation reaction occurring at a suitable temperature, such as a high temperature condensation at a temperature above about 120° C., or in the range of from about 120° C. to about 220° C., or in the range of from about 150° C. to about 210° C., of an organic carboxylic acid having an $R_1$ group as defined above with at least 1 molar equivalent of a suitable amino alcohol. In embodiments, the condensation reaction between the desired organic carboxylic acid and the suitable amino alcohol may be performed at a reduced pressure, such as less than about 100 mmHg, or in the range of from about 0.1 mmHg to about 50 mmHg, at a suitable temperature to ensure complete reaction, such as in the temperature range of from about 120° C. to about 220° C., or from about 130° C. to about 210° C., or from about 150° C. to about 210° C. The condensation reaction may be carried out with or without the use of a catalyst; however, catalysts may be used to expedite the completion of the reaction. The various types of catalysts that can be used include, for example, tetraalkyl titanates, dialkyltin oxides such as dibutyltin oxide (dibutyl oxostannane), tetraalkyltin oxide compounds such as dibutyltin dilaurate, dialkylstannoic acid, compounds such as butylstannoic acid, aluminum alkoxides, alkyl zinc, dialkyl zinc, zinc oxide, stannous oxide, or mixtures thereof; and which catalysts are selected in amounts of, for example, from about 0.005 mole percent to about 5 mole percent based on the starting diacid. In embodiments, the condensation reaction is complete (i.e., at least 95%, such as 99%, of the diacid has been reacted) in less than about 15 hours, such as less than about 12 hours, or less than about 10 hours.

Examples of oxazoline compounds are shown in Table 2 below along with selected data for their thermal properties and physical characteristics. The oxazoline compounds may be prepared by the methods described above, or by other methods such as those described in U.S. Pat. No. 5,817,169 and U.S. Pat. No. 5,698,017, each of which is hereby incorporated herein by reference in their entirety. Compounds 1-6 of Table 2 are hydroxyalkyl substituted mono-oxazolines and aliphatic esters of hydroalkyl substituted mono-oxazolines, all of which are crystalline and exhibit sharp melting and sharp crystallization temperatures, and may be suitable as crystalline agents in phase separation ink compositions. Compounds 7-11 of Table 2 are aromatic oxazolines and ester derivatives thereof, which generally exhibit amorphous properties, and may be suitable as binder resins for various ink compositions, including phase change inks for inkjet printing.

TABLE 2

| No. | Mono-Oxazoline compound | $T_{melt}$ (°C.) (DSC) | $T_{cryst}$ (°C.) (DSC) | Physical State (room temp) |
|---|---|---|---|---|
| 1 | 4,4-bis(hydroxymethyl)-2-heptadecyl-oxazoline | 98 | 72.4 | Crystalline |
| 2 | 4-(hydroxymethyl)-4-(stearoyloxymethyl)-2-heptadecyl-oxazoline | 60 | 45 | Crystalline |
| 3 | 4,4-bis(stearoyloxymethyl)-2-heptadecyl-oxazoline | 56 | 33 | Crystalline |
| 4 | 4,4-bis(hydroxymethyl)-2-heneicosyl-oxazoline | 108.6 | 92 | Crystalline |
| 5 | 4,4-bis(hydroxymethyl)-2-undecyl-oxazoline | 97 | 73 | Crystalline |
| 6 | 4,4-bis(lauroyloxymethyl)-2-undecyl-oxazoline | — | | Crystalline |
| 7 | 4-(hydroxymethyl)-4-((4-methoxybenzoyloxy)methyl)-2-undecyl-oxazoline | — | — | Amorphous |

TABLE 2-continued

| No. | Mono-Oxazoline compound | $T_{melt}$ (° C.) (DSC) | $T_{cryst}$ (° C.) (DSC) | Physical State (room temp) |
|---|---|---|---|---|
| 8 | (structure) | — | — | Amorphous |
| 9 | (structure) | Tg (onset) range from 5 to 15° C. | — | Amorphous |
| 10 | (structure) | — | — | Amorphous |
| 11 | (structure) | — | — | Amorphous |

The amorphous component provides tackiness and imparts robustness to the printed image. In the present embodiments, desirable amorphous materials have relatively low viscosity (<10³ cps, or from about 1 to about 500 cps, or from about 5 to about 300 cps) at temperatures greater than about 120° C., but very high viscosity (>10⁵ cps) at room temperature. The low viscosity at temperatures greater than about 120° C. provides wide formulation latitude while the high viscosity at room temperature imparts robustness.

In embodiments, the at least one amorphous component has a viscosity of about 10 to about 500 centipoise at a temperature of about 140° C. In further embodiments, the at least one amorphous component has a viscosity of greater than about 10⁵ centipoise at a temperature of from about 30° C. to less than about 120° C., or greater than about 10⁶ centipoise at a temperature of from about 30° C. to less than about 120° C. In one specific embodiment, the at least one amorphous component has a viscosity of greater than about 10⁵ centipoise at a temperature of about 30° C.

In certain embodiments, the difference in viscosity between the at least one crystallizable component and the at least one amorphous component is at least about 500 centipoise at a temperature of about 30° C.

The amorphous materials have a glass transition temperature (T_g) but do not exhibit crystallization and melting peaks by DSC (10° C./minute from −50 to 200 to −50° C.). The T_g values are typically from about −5° C. to about 50° C., or from about −5° C. to about 40° C., or from about −5° C. to about 35° C., to impart the desired toughness and flexibility to the inks. In one embodiment, the at least one amorphous component has a glass transition temperature of from about −5° C. to about 50° C. The selected amorphous materials have low molecular weights, such as less than 1000 g/mol, or from about 100 to about 1000 g/mol, or from about 200 to about 1000 g/mol, or from about 300 to about 1000 g/mol. Higher molecular weight amorphous materials such as polymers become viscous and sticky liquids at high temperatures, but have viscosities that are too high to be jettable with piezoelectric printheads at desirable temperatures.

Any suitable or desired material having the required properties can be selected for the amorphous component herein. In certain embodiments, the amorphous component can be selected from the group consisting of esters, oxazolines, diurethanes, and mixtures and combinations thereof.

In embodiments, the amorphous component can be selected from amorphous tartrate and citrate esters such as those described in commonly assigned, co-pending U.S. patent application Ser. No. 13/095,795, which is hereby incorporated by reference herein in its entirety, commonly assigned, co-pending U.S. patent application Ser. No. 13/095,015, which is hereby incorporated by reference herein in its entirety, commonly assigned, co-pending U.S. patent application Ser. No. 13/095,784, which is hereby incorporated by reference herein in its entirety.

The amorphous component can be prepared by any suitable or desired method. In embodiments, the amorphous component can be prepared as described in commonly assigned, co-pending U.S. patent application Ser. No. 13/095, 015, incorporated by reference hereinabove.

In embodiments, the amorphous component can comprise a citric acid tri-ester. The citric acid tri-ester can be prepared by any suitable or desired method. In embodiments, citric acid tri-ester can be prepared in accordance with the following reaction scheme.

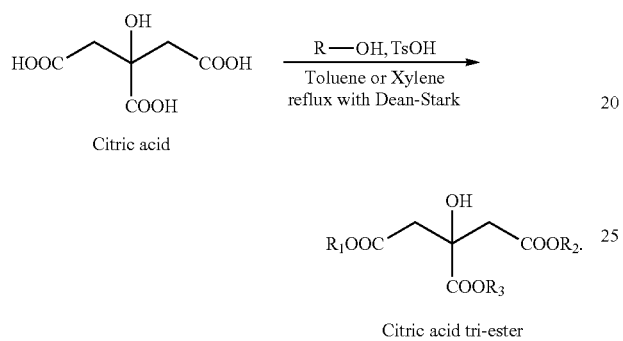

R—OH can be any suitable or desired alcohol. In embodiments, $R_1$, $R_2$, and $R_3$ can be the same or different, and wherein $R_1$, $R_2$, and $R_3$ are each independently selected from (i) an alkyl group having from about 1 to about 40, or from about 1 to about 20, or from about 1 to about 10 carbon atoms, although the number of carbon atoms can be outside of these ranges, which may be linear or branched, saturated or unsaturated, cyclic or acyclic, substituted or unsubstituted, and wherein heteroatoms either may or may not be present in the alkyl group; (ii) an aryl group, having from about 3 to about 40, or from about 6 to about 20, or from about 6 to about 10 carbon atoms, although the number of carbon atoms can be outside of these ranges, which may substituted or unsubstituted, and wherein heteroatoms either may or may not be present in the aryl group; (iii) an arylalkyl group, having from about 4 to about 40, or from about 7 to about 20, or from about 7 to about 12 carbon atoms, although the number of carbon atoms can be outside of these ranges, which may be substituted or unsubstituted, wherein the alkyl portion of the arylalkyl group can be linear or branched, saturated or unsaturated, cyclic or acyclic, substituted or unsubstituted, and wherein heteroatoms either may or may not be present in either the aryl or the alkyl portion of the arylalkyl group; or (iv) an alkylaryl group, having from about 4 to about 40, or from about 7 to about 20, or from about 7 to about 12 carbon atoms, although the number of carbon atoms can be outside of these ranges, which may be substituted or unsubstituted, wherein the alkyl portion of the alkylaryl group can be linear or branched, saturated or unsaturated, cyclic or acyclic, substituted or unsubstituted, and wherein heteroatoms either may or may not be present in either the aryl or the alkyl portion of the alkylaryl group.

In certain embodiments, R—OH is selected from the group consisting of

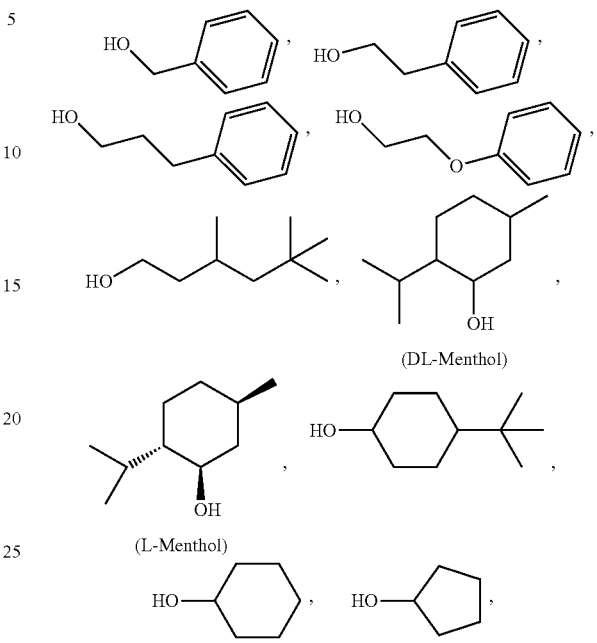

and mixtures thereof.

The process can be carried out at any suitable or desired temperature. In embodiments, the reaction mixture is heated to a temperature of from about 40 to about 250° C., or from about 90 to about 205° C., or from about 130 to about 180° C., although not limited to these ranges.

The reaction can be heated for any suitable or desired amount of time. In embodiments, heating the reaction mixture comprises heating for a period of from about 1 to about 48 hours, or from about 4 to about 30 hours, or from about 6 to about 10 hours, although not limited to these ranges.

Any suitable or desired catalyst can be used. Examples of suitable catalysts include, but are not limited to, those selected from the group consisting of sulfuric acid, phosphoric acid, hydrochloric acid, p-toluenesulfonic acid, zinc chloride, magnesium chloride, zinc acetate, magnesium acetate, dibutyl tin laurate, and butylstannoic acid, and mixtures and combinations thereof. In a specific embodiment, the catalyst can be selected from the Fascat® series of catalysts available from Arkema, Inc., such as Fascat® 4100. The catalyst can be selected in any effective amount. For example, the catalyst can be present in an amount of from about 0.01 to about 1 percent by weight of the reaction mixture, although not limited to this range.

The process may include additional process steps. The process can further comprise steps of cooling and isolating the product which steps can be performed according to the knowledge of a person having ordinary skill in the art. Various techniques for these processing steps are known in the chemical arts.

In embodiments, the process comprises cooling the reaction mixture to room temperature and treating the reaction mixture with a solvent. For example, the final resin product can be discharged out of the reaction vessel and into any suitable or desired amount of solvent to facilitate mixing with washing solutions, to facilitate material transfer between vessels, and the like. In embodiments, the process comprises cooling the reaction mixture to room temperature and treating the reaction mixture with an organic solvent selected from the group consisting of pentane, hexane, cyclohexane, heptane, octane, nonane, decane, undecane, dodecane, tridecane, tetradecane, toluene, xylene, benzene, and mesitylene. The amount of wash solvent can be any suitable or desired amount.

The process can include the removal of water, such as through evaporation or distillation. The process may further include any additional chemical synthesis steps according to the knowledge of a person having ordinary skill in the art.

In embodiments, the reaction product can be isolated by any suitable or desired method, such as by filtering the reaction product. The process can further comprise drying the reaction product. Drying can be performed by any suitable or desired method at any suitable or desired temperature. In embodiments, drying can be under vacuum. Drying can be performed at any suitable or desired temperature, such as from about 20 to about 250° C., or from about 30 to about 200° C., or from about 80 to about 120° C. for any suitable or desired amount of time, such as from about 0.1 to about 48 hours, or from about 1 to about 24 hours, or from about 6 to about 8 hours.

Examples of suitable amorphous materials that are derivatives of tartaric acid and citric acid are illustrated in Table 3.

TABLE 3

| Compound | Structure | Tg (° C.)* | η @ 140° C. (cps)** | MW (g/mol) |
| --- | --- | --- | --- | --- |
| 5 | | 19 | 10 | 426.59 |
| 6 | | 18 | 10 | 426.59 |
| 7 | | 13 | 10 | 426.59 |
| 8 | | 11 | 27 | 606.87 |

*The samples were measured on a Q1000 Differential Scanning Calorimeter (TA Instruments) at a rate of 10° C./min from −50° C. to 200° C. to −50° C.; midpoint values are quoted.

**The viscosities were measured on an ARES fluids rheometer RFS3 (TA instruments) equipped with a Peltier heating plate and using a 25 millimeter parallel plate. The method used was a temperature sweep from high to low temperatures, in temperature decrements of 5° C., a soak (equilibration) time of 120 seconds between each temperature and at a constant frequency of 1 Hz.

Amorphous oxazoline compounds and/or derivatives are described in commonly assigned, co-pending U.S. patent application Ser. No. 13/095,221, which is hereby incorporated by reference herein in its entirety, and U.S. patent application Ser. No. 13/095,174, which is hereby incorporated by reference herein in its entirety, can also be selected for the phase separation inks herein. For example, amorphous oxazoline compounds and/or derivatives can have viscosities that enable their use as a binder agent in the phase separation inks herein, and optionally as a rheology modifier, compatibilizer, synergist for pigment or other additive. In embodiments, the amorphous oxazoline compounds and/or derivatives may have complex viscosities at temperatures above about 110° C. in the range of from about 20 to about 500 cps (centipoise, or mPa-sec), or from about 40 to about 300 cps, or from about 50 to about 250 cps. At room temperature, the complex viscosity of the crystalline oxazoline compounds and/or derivatives of this disclosure may be $\geq 1 \times 10^5$ cps.

In embodiments, the amorphous oxazoline compounds and/or derivatives used as an exemplary binder resin in the phase separation ink herein, can have the following general structure

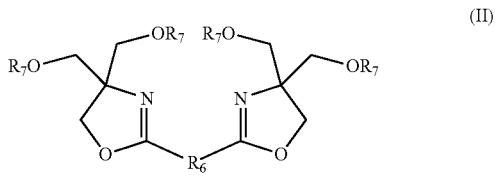

wherein $R_6$ is an alkylene group, arylene group, arylalkylene group, alkylarylene group, such an alkylene group containing from 1 to about 60 carbon atoms, or from about 2 to about 40 carbon atoms, or from about 4 to about 36 carbon atoms, or an arylene group, arylalkylene group, alkylarylene group containing from about 5 to about 20 carbon atoms, such as from about 6 to about 18 carbon atoms, or from about 7 to about 14 carbon atoms; and $R_7$ is an alkyl group, aryl group, alkylaryl group, aromatic group (each of which may or may not be substituted), or a hydrogen; for example, $R_7$ may be an alkyl group containing from 1 to about 60 carbon atoms, such as from 1 to about 30 carbon atoms, or from 1 to about 18 carbon atoms, or an aromatic group or aryl group containing from about 5 to about 20 carbon atoms, such as from about 6 to about 18 carbon atoms, or from about 7 to about 14 carbon atoms, or an acyl group of the general formula —(C=O)—(CH$_2$)$_n$CH$_3$, wherein n is either zero or an integer of from 1 to about 50, such as an integer of from about 4 to about 30, or an integer of from about 8 to about 16; or a urethane group of the general formula =(C=O)—NH—R$_z$, where R$_z$ is either a linear alkyl group of the formula —(CH$_2$)nCH$_3$ wherein n is either zero or an integer of from 1 to about 36, such as an integer of from 2 to about 24, or an integer of from about 5 to about 20, or where R$_z$ is an alkylaryl group containing from about 6 to about 20 carbon atoms, such as from about 7 to about 18 carbon atoms, or from about 7 to about 14 carbon atoms;

or where group $R_7$ may be an alkylaryl, such as an alkylaryl group of the general formula

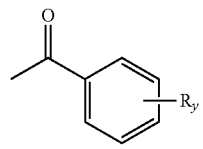

wherein $R_y$ is H, OH, OCH$_3$, Cl, Br, F, I, NH(COCH$_3$), CH$_3$, CH$_2$CH$_3$, isopropyl, t-butyl, CO$_2$CH$_3$, CO$_2$H, an alkyl group having from 1 to about 66 carbon atoms, or from about 2 to about 18 carbon atoms, or an alkoxy group having from 1 to about 8 carbon atoms, or from about 2 to about 6 carbon atoms.

In embodiments, the R groups of the Formulae I and II above of the present disclosure, such as $R_7$, may be the same or different from each other. For example, each of the $R_7$ groups may be the same or different from each other. In embodiments, one or more of the $R_7$ groups may be identical. Alternatively, in embodiments, each $R_7$ may be different from each other, as illustrated in the structure below

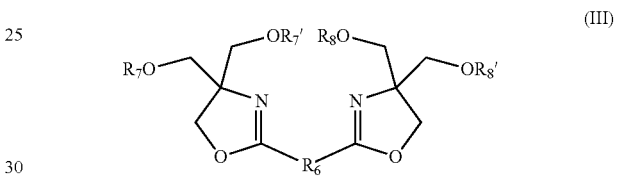

The amorphous oxazoline compounds and/or derivatives can be used in any desired amount, such as from about 0.5% to about 100%, or from about 10% to about 100%, or from about 30% to about 90% by weight of the respective component (e.g., exemplary amorphous binder resin) within the ink composition.

In embodiments, the amorphous oxazoline compounds and/or derivatives used herein may be mixture of one or more of the compounds comprising Formulae I, II, and III. For example, one or more of the compounds of Formula I may be the major component of an amorphous binder resin; or one or more of the compounds of Formulae II or III may be the major component of an amorphous binder resin.

In embodiments, group $R_6$ may be of the general formula $C_{36}H_{64+n}$ and is a branched alkylene group which may include unsaturated groups and/or cyclic groups, wherein n is an integer of 0, 1, 2, 3, 4, 5, 6, 7, 8, 9, or 10, including, for example, structural isomers of the general formula

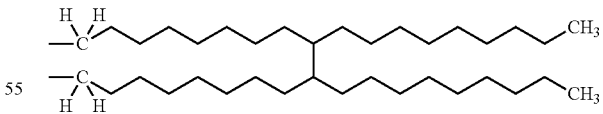

The compounds of Formulae II or III, where group $R_7$ (or $R_{7'}$ or $R_8$ or $R_{8'}$) is a substituent other than hydrogen, may be prepared in two steps. The first step involves the synthesis of a dimer-oxazoline tetra-alcohol, where $R_7$ in the Formula II is an H. In embodiments, the dimer-oxazoline tetra-alcohol may be prepared by a condensation reaction occurring at a suitable temperature, such as a high temperature condensation at a temperature above about 120° C., or in the range of from about 120° C. to about 220° C., or in the range of from about 150° C. to about 210° C., of a suitable diacid having an $R_6$ group as defined above with at least 2 molar equivalents of tris(hydroxymethyl)aminomethane. In embodiments, the condensation reaction between the suitable diacid and the tris(hydroxymethyl)aminomethane may be performed at a reduced pressure, such as less than about 100 mmHg, or in the range of from about 0.1 mmHg to about 50 mmHg, at a suitable temperature to ensure complete reaction, such as in the temperature range of from about 120° C. to about 220° C., or from about 130° C. to about 210° C., or from about 150° C. to about 210° C. The condensation reaction may be carried out with or without the use of a catalyst; however, catalysts may be used to expedite the completion of the reaction. The various types of catalysts that can be used include, for example, tetraalkyl titanates, dialkyltin oxides such as dibutyltin oxide (dibutyl oxostannane), tetraalkyltin oxide compounds such as dibutyltin dilaurate, dialkylstannoic acid compounds such as butylstannoic acid, aluminum alkoxides, alkyl zinc, dialkyl zinc, zinc oxide, stannous oxide, or mixtures thereof; and which catalysts are selected in amounts of, for example, from about 0.005 mole percent to about 5 mole percent based on the starting diacid. In embodiments, the condensation reaction is complete (i.e., at least 95%, such as 99%, of the diacid has been reacted) in less than about 15 hours, such as less than about 12 hours, or less than about 10 hours.

As an example, the dimer oxazoline tetra-alcohol with $R_6$ equal to —$(CH_2)_n$— wherein n=10, may be prepared from the high-temperature condensation of 1,12-dodecanedioic acid with 2 molar equivalents of tris(hydroxymethyl)-aminomethane, as depicted in the reaction scheme below, where $R_6$ may be defined as set forth above with respect to Formula II

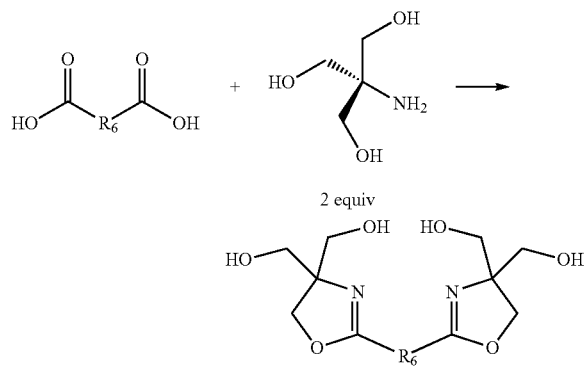

The product of this reaction may be purified by recrystallization in a suitable organic solvent, for example, simple alcohol solvents such as methanol, ethanol or iso-propanol, or combinations of polar organic solvents with non-polar organic solvents, such as, for example, the use of ethyl acetate with n-hexane in a volume ratio of, respectively, from about 0.1 parts to 5 parts ethyl acetate to about 1 part to about 20 parts n-hexane. It is a preferred embodiment that the product of the reaction scheme above is purified before proceeding onto a second chemical transformation, which may include, for example, esterification of the tetra-alcohol, formation of urethane groups from the tetra-alcohol, etherification of the tetra-alcohol, or various other chemical transformations.

Esterification of the tetra-alcohol may be accomplished by several reaction methods known in the art, including by direct condensation with a monocarboxylic acid. For example, the tetra-ester of Formula III, wherein all of the groups $R_7$, $R_{7'}$, $R_8$ and $R_{8'}$ are the same acyl groups, can be readily prepared by condensation with at least 4 molar equivalents of a desired monocarboxylic acid carried out in the absence of solvent, at a suitable high temperature to ensure complete reaction (such as above about 150° C., or in the range of from about 150° C. to about 250° C.) and under ambient pressure. As an example, when the tetra-esterification is accomplished by direct condensation with 4 molar equivalents of lauric acid (dodecanoic acid), the product obtained is the dodecanoate tetra-ester of the starting dimer-oxazoline tetra-alcohol.

In further embodiments, when the esterification of the dimer-oxazoline of Formula III is carried out with an excess amount of an aromatic monocarboxylic acid (such as 4-methoxybenzoic acid) to afford the tetra-ester, one or more oxazoline products may be obtained in a reproducible manner (proven by HPLC-MS analysis). The mixture of products includes the dimer oxazoline tetra-(4-methoxybenzoate) ester as a product, and aromatic mono-oxazoline products among the major products, such as 4-methoxyphenyloxazoline compounds. An ink composition including such a mixture of one or more substituted dimer oxazoline and aromatic oxazoline compounds and/or derivatives has desirable rheological properties for use in phase separation ink compositions, and provides robust and durable prints.

In further embodiments, the preparation of amorphous substituted aromatic mono-oxazoline compounds and/or derivatives, such as those shown in Table 2, may be accomplished by direct condensation reaction between an aromatic monocarboxylic acid and a suitable aminoalcohol, at temperatures that are reduced from the equivalent condensation involving an alkane carboxylic acid. For example, an aromatic mono-oxazoline diester compound can be prepared by condensation reaction between three molar equivalents of 4-methoxybenzoic acid and one equivalent of tris(hydroxymethyl)-aminomethane carried out at a reduced temperature, such as less than about 180° C., or in the range of from about 150° C. to about 180° C. Due to the conjugation of the phenyl group with the oxazoline imine moiety in the oxazoline product, the thermal activation energy required for this condensation reaction is reduced, and therefore the aromatic oxazoline compound is produced at lower reaction temperatures.

In embodiments, derivatives of the dimer-oxazoline compounds shown in Formula III can be ester derivatives, wherein one or more groups $R_7$, $R_{7'}$, $R_8$, and $R_{8'}$ are acyl groups, such as a group of the general formula —(C=O)—$(CH_2)_n$$CH_3$, wherein n is either zero or an integer of from 1 to about 50, such as an integer of from about 4 to about 30, or an integer of from about 8 to about 16; or an alkylaryl group, such as one of the general formula

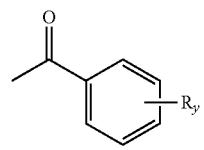

wherein $R_y$ is H, OH, $OCH_3$, Cl, Br, F, I, $NH(COCH_3)$, $CH_3$, $CH_2CH_3$, isopropyl, t-butyl, $CO_2CH_3$, $CO_2H$, an alkyl group having from 1 to about 18 carbons or from about 2 to about 66 carbons, or alkoxy group having from 1 to about 8 carbons or from about 2 to about 6 carbons.

Earlier in embodiments, Table 2 shows selected examples of mono-oxazoline compounds that are aromatic oxazoline compounds or derivatives, which have amorphous characteristics. Table 4 (below) shows example structures of dimeric oxazoline compounds which also have amorphous characteristics, and are suitable for use as amorphous binder resin of the phase change inks herein.

TABLE 4

| Entry No. | Oxazoline compound | $R_6$ | $R_7$ ($R_7'$) | $R_8$ ($R_8'$) |
|---|---|---|---|---|
| 1 | [structure] | —(CH$_2$)$_n$— where n = 2, 4, 8, 10, 12, 16 | H | H |
| 2 | [structure] | —(CH$_2$)$_n$— Where n = 2, 4, 8, 10, 12, 16 | —(C=O)—(CH$_2$)$_n$CH$_3$ Where n = 2, 4, 6, 10, 14, and range from 30-50 | —(C=O)—(CH$_2$)$_n$CH$_3$ Where n = 2, 4, 6, 10, 14, and range from 30-50 |
| 3 | [structure] | —(CH$_2$)$_n$— where n = 2, 4, 8, 10, 12, 16 | [acetylphenyl-R$_y$ structure] where R$_y$ = H, OH, OCH$_3$, Cl, Br, F, I, NH(COCH$_3$), CH$_3$, isopropyl, t-butyl, CO$_2$CH$_3$, CO$_2$H, (CH$_2$)$_m$CH$_3$ where integer m is 1 to 17, and O(CH$_2$)$_p$CH$_3$ where integer p is 1 to 7. | [acetylphenyl-R$_y$ structure] where R$_y$ = H, OH, OCH$_3$, Cl, Br, F, I, NH(COCH$_3$), CH$_3$, isopropyl, t-butyl, CO$_2$CH$_3$, CO$_2$H, (CH$_2$)$_m$CH$_3$ where integer m is 1 to 17, and O(CH$_2$)$_p$CH$_3$ where integer p is 1 to 7. |
| 4 | [structure] | C$_{36}$H$_{64+n}$ branched alkylene group, including structural isomer (below) | H | H |

TABLE 4-continued

| Entry No. | Oxazoline compound | $R_6$ | $R_7$ ($R_7'$) | $R_8$ ($R_8'$) |
|---|---|---|---|---|
| 5 | (structure with R₇O, OR₇', R₈O, OR₈' on bis-oxazoline with R₆ bridge) | $C_{36}H_{64+n}$ branched alkylene group, including structural isomer (below) | —(C=O)—(CH$_2$)$_n$CH$_3$ Where n = 2, 4, 6, 10, 14, and range from 30-50 | —(C=O)—(CH$_2$)$_n$CH$_3$ Where n = 2, 4, 6, 10, 14, and range from 30-50 |
| 6 | (structure with R₇O, OR₇', R₈O, OR₈' on bis-oxazoline with R₆ bridge) | $C_{36}H_{64+n}$ branched alkylene group, including structural isomer (below) | benzoyl with R$_y$ substituent, where R$_y$ = H, OH, OCH$_3$, Cl, Br, F, I, NH(COCH$_3$), CH$_3$, isopropyl, t-butyl, CO$_2$CH$_3$, CO$_2$H, (CH$_2$)$_m$CH$_3$ where integer m is 1 to 17, and O(CH$_2$)$_p$CH$_3$ where integer p is 1 to 7. | benzoyl with R$_y$ substituent, where R$_y$ = H, OH, OCH$_3$, Cl, Br, F, I, NH(COCH$_3$), CH$_3$, isopropyl, t-butyl, CO$_2$CH$_3$, CO$_2$H, (CH$_2$)$_m$CH$_3$ where integer m is 1 to 17, and O(CH$_2$)$_p$CH$_3$ where integer p is 1 to 7. |

In one specific embodiment, the amorphous component comprises di-L menthyl L-tartrate and the crystallizable component comprises diphenethyl L-tartrate. In another specific embodiment, the amorphous component comprises tri-DL-menthyl citrate (TMC) and the crystallizable component comprises Bis(4-methoxyphenyl) octanedioate.

The crystalline component can be present in the phase separation ink in any suitable or desired amount. In embodiments, the crystalline component is provided at from about 60 to about 95, or from about 65 to about 95, or from about 70 to about 90 weight percent, based upon the total combined weight of the crystalline and amorphous components.

The amorphous component can be present in the phase change ink at any suitable or desired amount. In embodiments, the amorphous component is provided at from about 5 to about 40, or from about 5 to about 35, or from about 10 to about 30 weight percent, based upon the total combined weight of the crystalline and amorphous components.

In embodiments, the ratio of crystalline component to amorphous component is from about 60:40 to about 95:5 percent by weight, based upon the total combined weight of the crystalline and amorphous components. In embodiments, the weight ratio of the crystalline component to amorphous component is from about 65:35 to about 95:5, or from about 70:30 to about 90:10 percent by weight, based upon the total combined weight of the crystalline and amorphous components. In some embodiments, the weight ratio of the crystalline component to amorphous component is 95:5, 80:20, or 60:40. In other embodiments, the weight ratio of the crystalline component to amorphous component is 70:30, 50:50, or 30:70.

The phase separation ink can further contain a colorant compound. This optional colorant can be present in the ink in any desired or effective amount to obtain the desired color or hue, in embodiments from about 0.1 percent to about 50 percent by weight of the ink. Any desired or effective colorant can be employed, including dyes, pigments, mixtures thereof, and the like, provided that the colorant can be dissolved or dispersed in the ink vehicle. The phase separation carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi);

Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN(Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

Pigments are also suitable colorants for the phase separation ink. Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and U.S. Pat. No. 7,427,323, the disclosures of each of which are hereby totally incorporated by reference herein in their entireties.

The colorant may be present in the phase separation ink in any desired or effective amount to obtain the desired color or hue such as, for example, from about 0.1 to about 50 percent by weight of the ink, about 0.2 to about 20 percent by weight of the ink, or about 0.5 to about 10 percent by weight of the ink.

The inks of the present disclosure can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, NAUGUARD® 445, and NAUGUARD® 512, commercially available from Uniroyal Chemical Company, Oxford, Conn., IRGANOX® 1010 (Ciba Geigy), N,N'-hexamethylene bis(3,5-di-tert-butyl-4-hydroxy hydrocinnamamide) (IRGANOX® 1098, BASF), 2,2-bis(4-(2-(3,5-di-tert-butyl-4-hydroxyhydrocinnamoyloxy)ethoxyphenyl)propane (TOPANOL-205®, available from Vertellus), tris(4-tert-butyl-3-hydroxy-2,6-dimethyl benzyl)isocyanurate (Aldrich), 2,2'-ethylidene bis(4,6-di-tert-butylphenyl)fluoro phosphonite (ETHANOX-398®, Albermarle Corporation), tetrakis (2,4-di-tert-butylphenyl)-4,4'-biphenyl diphosphonite (Aldrich 46), pentaerythritol tetrastearate (TCI America), tributylammonium hypophosphite (Aldrich), 2,6-di-tert-butyl-4-methoxyphenol (Aldrich), 2,4-di-tert-butyl-6-(4-methoxybenzyl)phenol (Aldrich), 4-bromo-2,6-dimethylphenol (Aldrich), 4-bromo-3,5-didimethylphenol (Aldrich), 4-bromo-2-nitrophenol (Aldrich), 4-(diethyl aminomethyl)-2,5-dimethylphenol (Aldrich), 3-dimethylaminophenol (Aldrich), 2-amino-4-tert-amylphenol (Aldrich), 2,6-bis(hydroxymethyl)-p-cresol (Aldrich), 2,2'-methylenediphenol (Aldrich), 5-(diethylamino)-2-nitrosophenol (Aldrich), 2,6-dichloro-4-fluorophenol (Aldrich), 2,6-dibromo fluoro phenol (Aldrich), α-trifluoro-o-cresol (Aldrich), 2-bromo-4-fluorophenol (Aldrich), 4-fluorophenol (Aldrich), 4-chlorophenyl-2-chloro-1,1,2-tri-fluoroethyl sulfone (Aldrich), 3,4-difluoro phenylacetic acid (Adrich), 3-fluorophenylacetic acid (Aldrich), 3,5-difluoro phenylacetic acid (Aldrich), 2-fluorophenylacetic acid (Aldrich), 2,5-bis (trifluoromethyl)benzoic acid (Aldrich), ethyl-2-(4-(4-(trifluoromethyl)phenoxy)phenoxy)propionate (Aldrich), tetrakis (2,4-di-tert-butyl phenyl)-4,4'-biphenyl diphosphonite (Aldrich), 4-tert-amyl phenol (Aldrich), 3-(2H-benzotriazol-2-yl)-4-hydroxy phenethylalcohol (Aldrich), and the like, as well as mixtures thereof. When present, the optional antioxidant is present in the ink in any desired or effective amount, such as from about 0.01 percent to about 20 percent by weight of the ink.

Other optional additives to the inks include defoamer, slip and leveling agents clarifiers, tackifiers, adhesives, plasticizers, and the like, in any suitable or desired amount such as from about 0.1 to about 50 percent by weight of the ink.

The phase separation ink can be prepared by any suitable or desired method. For example, the components can be combined with stiffing and heating to form the phase separation ink. The phase separation ink carrier materials may be combined in any suitable or desired order. For example, each of the components of the ink carrier can be mixed together, followed by heating the mixture to at least its melting point, for example from about 60° C. to about 150° C., about 80° C. to about 145° C., or about 85° C. to about 140° C., although not limited. The colorant may be added before the ink ingredients have been heated or after the ink ingredients have been heated. When pigments are the selected colorants, the molten mixture may be subjected to grinding in an attritor or media mill apparatus or other high energy mixing equipment to affect dispersion of the pigment in the ink carrier. The heated mixture can then be stirred, such as for about 5 seconds to about 30 minutes or more, to obtain a substantially homogeneous, uniform melt, followed by cooling the ink to ambient temperature (typically from about 20° C. to about 25° C.). The inks are solid at ambient temperature.

The ink compositions herein generally have melt viscosities of from about 1 centipoise to about 14 centipoise, or from about 2 centipoise to about 13 centipoise, or from about 3 centipoise to about 12 centipoise, although the melt viscosity can be outside of these ranges, at the jetting temperature, in embodiments, jetting temperature being from about 95° C. to about 150° C., about 100° C. to about 145° C., about 100° C. to about 140° C., or no higher than about 150° C., although the jetting temperature can be outside of these ranges. In embodiments, the phase separation ink herein has a viscosity at jetting temperature of from about 2 centipoise to less than about 12 centipoise, wherein jetting temperature is from about 50° C. to about 140° C. In a specific embodiment, the phase separation ink herein has a viscosity of less than about 12 centipoise at jetting temperature, wherein jetting temperature is from about 50° C. to about 140° C. In another specific embodiment, the phase separation ink herein has a viscosity of about 2 to about 12 centipoise at a jetting temperature of about 140° C.

The phase separation inks herein can be employed in apparatus for direct printing ink jet processes and in indirect (offset) printing ink jet applications. One embodiment of the present disclosure is directed to a process which comprises incorporating a phase separation ink into an ink jet printing apparatus, melting the ink, and causing droplets of the melted ink to be ejected in an imagewise pattern onto a recording substrate. A direct printing process is disclosed in, for example, U.S. Pat. No. 5,195,430, the disclosure of which is totally incorporated herein by reference. In embodiments, the substrate is a final recording sheet and droplets of the melted ink are ejected in an imagewise pattern directly onto the final recording sheet.

Yet another embodiment of the present disclosure is directed to a process which comprises incorporating a phase separation ink into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In embodiments, the process can include using a belt or thin drum to transport the ink image on the intermediate transfer member through the temperatures zones necessary to induce the phase separation and then transfer and spread the ink image on a final image receiving substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus.

Inks of the present disclosure can also be employed in other hot melt printing processes, such as hot melt acoustic ink jet printing, hot melt thermal ink jet printing, hot melt continuous stream or deflection ink jet printing, and the like. Phase separation inks of the present disclosure can also be used in printing processes other than hot melt ink jet printing processes.

In embodiments, the phase separation ink herein can be used in a process which comprises (1) incorporating into an ink jet printing apparatus a phase change ink comprising at least one crystallizable component comprising a material that crystallizes as it cools from a first ink jetting temperature to a second temperature that is lower than the ink jetting temperature, wherein the second temperature is sufficient to initiate crystallization of the at least one crystallizable component; at least one amorphous component comprising a material that remains amorphous at the second temperature; and an optional colorant; wherein the at least one crystallizable component and the at least one amorphous component are in a molten, single phase state at the first ink jetting temperature; wherein at the second temperature, the phase separation ink comprises a crystalline phase comprising the at least one crystallizable component and an amorphous phase comprising the at least one amorphous component; wherein the amorphous phase of the at least one phase separation ink substantially penetrates into the final image receiving substrate; and wherein the crystalline phase of the at least one phase separation ink substantially remains on the surface of the final image receiving substrate; (2) melting the ink; (3) causing droplets of the melted ink to be ejected in an imagewise pattern onto an intermediate transfer member or directly onto the final image receiving substrate; and (4) optionally, if an intermediate transfer member is used, transferring the image to the final image receiving substrate.

In embodiments, the phase separation inks herein can be printed using the process described in commonly assigned, co-pending U.S. patent application Ser. No. 13/095,038, which is hereby incorporated by reference herein in its entirety. In embodiments, this process includes disposing at least one phase separation ink in an imagewise fashion onto a final image receiving substrate to form an ink image, wherein disposing is at a first temperature at which the at least one phase separation ink is in a molten, unseparated state; cooling the ink image to a second temperature sufficient to initiate crystallization of at least one component of the at least one phase separation ink, wherein at the second temperature the at least one phase separation ink comprises a crystalline phase and an amorphous phase; wherein the amorphous phase of the at least one phase separation ink substantially penetrates into the final image receiving substrate; and wherein the crystalline phase of the at least one phase separation ink substantially remains on the surface of the final image receiving substrate; applying pressure to the ink image on the final image receiving substrate; and allowing the ink to complete crystallization.

Any suitable substrate or recording sheet can be employed, including plain papers such as XEROX® 4200 papers, XEROX® Image Series papers, Courtland 4024 DP paper, ruled notebook paper, bond paper, coated paper, silica coated papers such as Sharp Company silica coated paper, JuJo paper, Hammermill® Laserprint Paper, and the like, glossy coated papers, such as XEROX® Digital Color Elite Gloss, Sappi Warren Papers LUSTROGLOSS®, specialty papers such as Xerox® DURAPAPER®, and the like, calcium carbonate coated paper, clay coated paper, kaolin clay coated paper, and the like, transparency materials, fabrics, textile products, plastics, polymeric films, inorganic substrates such as metals and wood, and the like. In a specific embodiment, the final image receiving substrate is coated paper. In another specific embodiment, the final image receiving substrate is clay coated paper.

In embodiments, the final image receiving substrate comprises a base layer, a top coat layer disposed over a first surface of the base layer; and, optionally, a bottom coat layer disposed over a second, opposite surface of the base layer; wherein the ink image is disposed on the top coat layer; wherein the amorphous phase of the at least one phase separation ink substantially penetrates into the top coat layer of the final image receiving substrate, in embodiments to a maximum depth of about 10 micrometers; and wherein the crystalline phase of the at least one phase separation ink substantially remains on the surface of the top coat layer of the final image receiving substrate. In embodiments, the base layer comprises paper.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of Oxazoline Crystalline Phase-Change Component

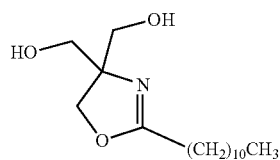

A 1 Liter Parr reactor equipped with a double turbine agitator, and distillation apparatus, was charged with dodecanoic acid (200 grams; SIGMA-ALDRICH, Milwaukee, Wis.), tris (hydroxymethyl)amino-methane (92 grams; EMD Chemicals, New Jersey), and FASCAT® 4100 as catalyst (0.45 grams; Arkema Inc). The contents were heated to 165° C. for a 2 hour period, followed by increasing the temperature to 205° C. over a 2 hour period during which time the water distillate was collected in a distillation receiver. The reactor pressure was then reduced to about 1-2 mm-Hg for one hour, followed by discharging into a container and cooled to room temperature. The product was purified by dissolving with mild heating in a mixture of ethyl acetate (2.5 parts) and hexane (10 parts), and then cooling to room temperature to crystallize the pure product as a white granular powder. The peak melting point (DSC) was determined to be 99° C. Rheological analysis of this material was measured over a temperature range of 130° C. down to 40° C. using an ARES fluids rheometer RFS3 (TA Instruments) (oscillation frequency of 1 Hz, 25 millimeter parallel plate geometry, 200% applied strain). The material exhibited a melt viscosity at 130° C. of 8.2 cps, an onset temperature of crystallization at 95° C., a peak viscosity of $4.5 \times 10^6$ cps, and a peak crystallization temperature at 85° C.

Example 2

Preparation of Amorphous Binder Resin of Oxazoline Ink

Step I: Synthesis of Dimer Oxazoline Tetra-Alcohol Precursor

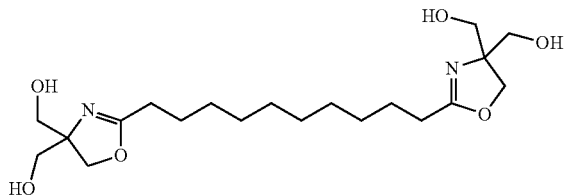 [SMILES: OCC1(CO)COC(CCCCCCCCCCC2=NC(CO)(CO)CO2)=N1]

Into a 1 Liter Parr reactor equipped with a double turbine agitator, and distillation apparatus, was charged (in order): 1,12-dodecanedioic acid (291 grams; SIGMA-ALDRICH Ltd., Milwaukee, Wis.), tris-(hydroxymethyl)-aminomethane (306.9 grams; EMD chemicals, New Jersey), and FASCAT® 4100 catalyst (1.0 g, Arkema Inc.). The reaction mixture was heated to internal temperature of 165° C. for a 2 hour period, followed by increasing the temperature to 205° C. over another 2 hour period, during which time the water distillate was collected in a receiver. The reaction pressure was then reduced to approximately 1-2 mmHg for 1 hour, after which the contents were discharged into a container and cooled. The crude product yield was approximately 480 grams of a very hard, amber colored glass resin (estimated as 80% pure by $^1$H-NMR). The product was purified by first dissolving the crude compound in boiling methanol, which was then filtered hot to remove insoluble material, and then cooled gradually to room temperature to afford the recrystallized product. After vacuum filtration and rinsing with cold methanol, the pure product is obtained as white granular powder, with peak melting point >170° C. (by DSC).

Step II: Preparation of Amorphous Binder Resin, a Mixture of Oxazoline Compounds Into a 1 liter stainless steel jacketed Buchi reactor equipped with distillation condenser, 4-blade impeller, and thermocouple was charged, in order: 30.4 grams (0.075 mol) Dimer Oxazoline Tetra Alcohol of Step I, 228.2 grams (1.50 mol) 4-methoxybenzoic acid, 51.48 grams (0.425 mol) tris(hydroxymethyl)aminomethane (obtained from Aldrich, 98%), and 0.26 gram (1.2 mmol) FASCAT® 4100 catalyst. The mixture was heated up to 160° C. jacket temperature under a pressurized nitrogen atmosphere of 50 kPa without stirring. Once at temperature, the stirring was begun and the jacket temperature was gradually increased to 180° C. over 30 minutes, and then maintained for about 2 hours. Water distillate from the condensation reaction was collected over this time period (about 10 grams). The jacket temperature was then increased to 190° C. and maintained for 1 hour, which produced more water distillate. Vacuum reduced pressure of ~10 ton was applied for another 1 hour, which produced ~10 grams of water distillate. Once there was no more water distillate collected, the reaction was stopped by cooling to 130° C., and then the product was discharged. The crude yield of resin product was about 400 grams, obtained as a light

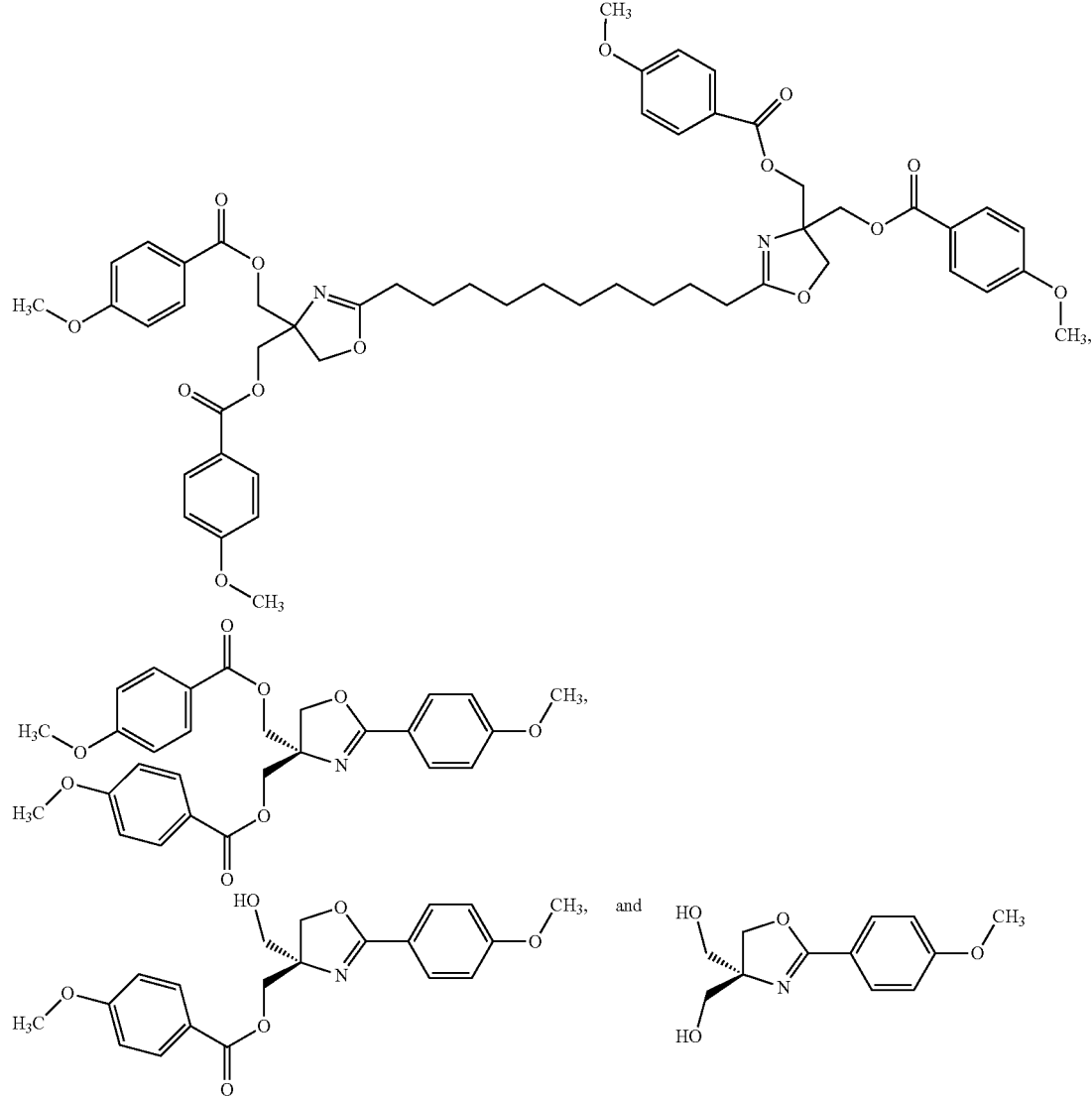

amber-colored viscous resin without further purification. Rheological analysis of this material was measured over a temperature range of 130° C. down to 40° C. using an ARES fluids rheometer RFS3 (TA Instruments) (oscillation frequency of 1 Hz, 25 mm parallel plate geometry, 200% applied strain). The viscosity of this material at 130° C. was measured to be about 75 cps, and viscosity of about $1.5 \times 10^5$ cps at about 50° C.

Examples 3a and 3b

General Preparation of Oxazoline Ink. Two example formulations of Oxazoline Inks are provided in Table 5 below.

TABLE 5

| | Component | Example 3a Wt % | Example 3b Wt % |
|---|---|---|---|
| Crystalline Phase-change agent | Example 1 Oxazoline Compound | 62.80 | 63.5 |
| Amorphous Binder Resin | Example 2 Oxazoline Material | 30.00 | 30.00 |
| Viscosity modifier | (KEMAMIDE S-180 (obtained from Witco Corp., USA) | 4.00 | 3.50 |
| Antioxidant | Naugard 445 (obtained from Chemtura, USA) | 0.20 | 0.00 |
| Colorant | Orasol Blue GN dye (obtained from Ciba-Geigy, USA) | 3.00 | 3.00 |
| Ink Properties | *Viscosity @ 130° C. (cps) | 13.6 | 11.20 |
| | *Viscosity @ 60° C. (cps) | $4.6 \times 10^6$ | $5.4 \times 10^7$ |
| | Onset Tcryst. (° C.) (by rheology) | 78 | 88 |
| | Melt Temp (° C.) (by DSC**) | 81.5 | 89 |
| | Tcryst. (° C.) (by DSC**) | 62 (small) 54 (large) | 66.5 |

*Oscillation Frequency = 1 Hz; 25 mm parallel plate geometry; gap = 0.2 mm; strain % = 200%-400%, strain independent viscosities as measured on an ARES fluids rheometer RFS3.
**DSC analysis performed on a TA Instruments Q1000 machine, measured after two heating and cooling cycles using a scan rate of 10° C./min.

Into a 500 milliliter resin kettle was charged, in the following order: amorphous oxazoline binder resin prepared according to Example 2 (30 weight % of ink); molten oxazoline crystalline compound prepared according to Example 1 (62-64 weight % of ink; see formulations in Table 5); Kemamide® S-180 as a viscosity modifier (commercially available from Chemtura Corporation) (3-4 weight % of ink); NAUGARD 445® as antioxidant (obtained from Chemtura, USA); and lastly a colorant (Orasol Blue GN dye, obtained from Ciba-Geigy, USA). The mixture was heated in a mantle at 130° C. internal temperature and stirred mechanically for about 2 hours using a stainless steel 4-blade 90° pitch impeller at approximately 175-250 rpm. The ink base mixture was then hot-filtered at 120° C. using a KST filtration apparatus through a 5-micron stainless steel 325×2300 mesh wire filter cloth (type 304 SS obtained from Gerard Daniel Worldwide, Hanover, USA), in order to remove particulates. The molten mixture was returned to a 500 milliliter resin kettle and heated at 130° C. internal temperature while stirring mechanically. Into this ink base was added colorant (6.0 grams of Orasol® Blue GN dye, obtained from CIBA; 3 weight % of ink) in small portions over a 0.5 hour period of time while continuing to heat. Once the colorant addition was completed, the colored ink composition was allowed to stir for addition 3-4 hrs at 130° C. while stirring at 275 rpm, to ensure homogeneity of the ink composition. The colored ink composition was then hot-filtered once more at 120° C. through the steel 325×2300 mesh wire filter cloth, before being dispensed into mould trays and solidified while cooling at room temperature. The colored ink compositions were characterized for thermal properties by DSC and for rheological properties using an ARES fluids rheometer RFS3.

Figure 6:
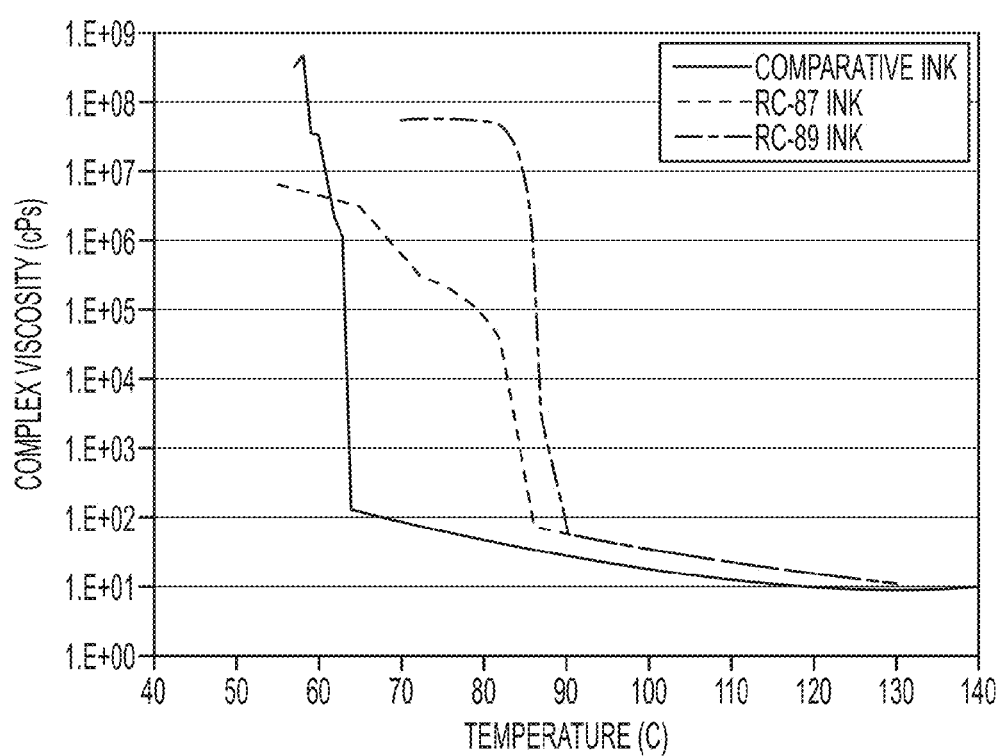
FIG. 6 is a graph showing complex viscosity (y-axis, centipoise) versus temperature (x-axis, ° C.) for a comparative ink and for two inks in accordance with the present disclosure.

The viscosity of the ink Example 3a at 130° C. was measured to be about 13 centipoise and had a crystallization onset temperature at approximately 80° C. The viscosity of the ink Example 3b at 130° C. was measured to be about 11 centipoise and had a crystallization onset temperature at approximately 90° C. FIG. 6 shows full rheological profiles for the ink of Example 3a, the ink of Example 3b, as well as for a comparative, commercially available ink, Océ TonerPearls, Cyan ink.

Example 4

Synthesis of tri-DL-menthyl citrate (TMC) Amorphous Component 20 grams (104 millimoles) of citric acid, 48.8 grams (312 millimoles) of DL-menthol, and 240 milliliters of xylene were added to a 500 milliliter flask equipped with a Dean-Stark trap to give a suspension. 0.396 gram (2.08 millimoles) of p-toluenesulfonic acid monohydrate was added and the mixture was refluxed for 21 hours with azeotropic removal of water. The reaction mixture was cooled down to room temperature and washed with 10 weight % KOH aq. (1×) and brine (2×), then dried over $MgSO_4$. After filtration and removal of the solvent, the residue was dried under vacuum with stirring at 120° C. to obtain 49.3 grams (yield: 78%) of amorphous solid. The sample was characterized by $^1$H NMR and acid number analysis (16.34 milligrams KOH/gram).

Example 5

Preparation of Ink 1,6-Hexanediol-bis(4-methoxybenzoate) ester (melting point=91° C.) of the formula

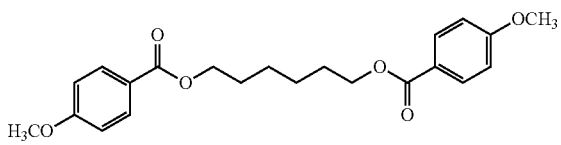 [SMILES: COc1ccc(C(=O)OCCCCCCOC(=O)c2ccc(OC)cc2)cc1]

was used for the crystalline component for Example 5. 1,6-Hexanediol-bis(4-methoxybenzoate) was prepared as described in U.S. Pat. No. 6,682,587, which is hereby incorporated by reference herein in its entirety. Tri-DL-menthyl citrate (TMC) of the formula

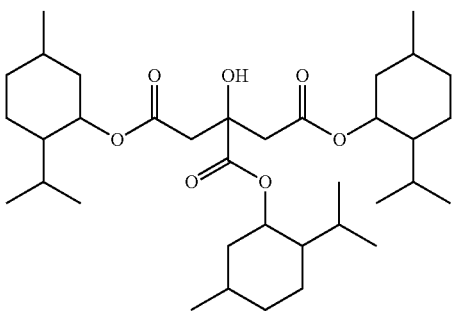 [SMILES: CC1CCC(C(C)C)C(OC(=O)CC(O)(CC(=O)OC2CC(C)CCC2C(C)C)C(=O)OC2CC(C)CCC2C(C)C)C1]

was used for the amorphous component for Example 5. The TMC and the crystalline material were stirred in the molten state at 120° C., then cooled down to obtain ink samples. The crystalline/amorphous ratio of the ink samples were 100/0, 70/30, 50/50, 30/70, and 0/100 in weight percent as shown in the Table 6 below.

TABLE 6

| Sample | Amorphous (weight %) | Crystalline (weight %) |
|---|---|---|
| Example 5a | 0 | 100 |
| Example 5b | 30 | 70 |
| Example 5c | 50 | 50 |
| Example 5d | 70 | 30 |
| Example 5e | 100 | 0 |

Figure 7:
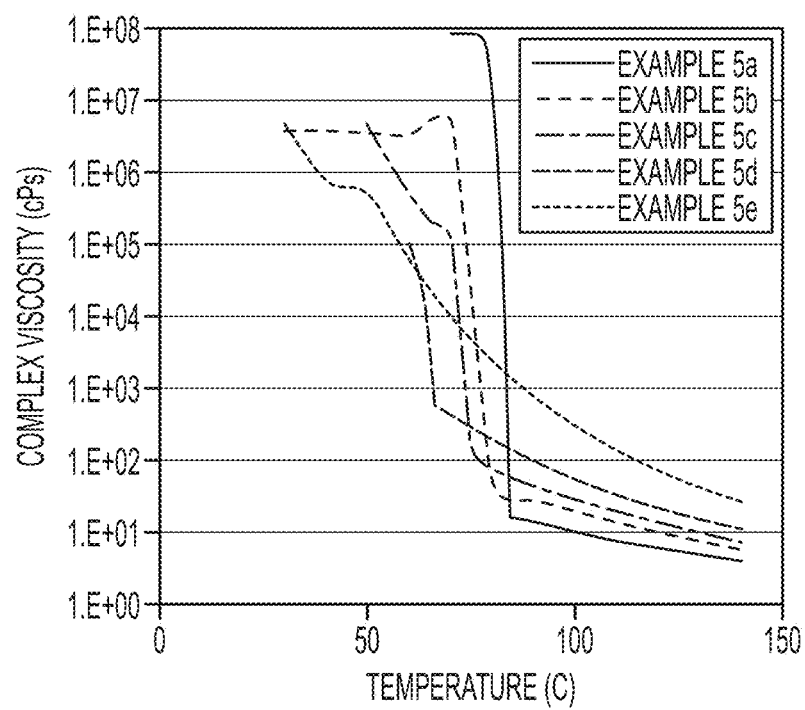
FIG. 7 is a graph showing complex viscosity (y-axis, centipoise) versus temperature (x-axis, ° C.) for five inks in accordance with the present disclosure.

The two materials were well miscible in all of the mixing ratios. FIG. 7 shows rheology data of the ink samples of Table 6. All of the inks showed phase transitions to >$10^6$ centipoise in the desirable temperature range (60° C.<T<130° C.) and the phase transition temperature is adjustable by changing the crystalline/amorphous ratio. Furthermore, viscosities at around 130° C. (jetting temperature) were about 10 centipoise and again adjustable by changing the crystalline/amorphous ratio.

Cross-sectional microscopy offers an insight into the mechanism participating in providing the improved image scratch and fold behavior achieved with the phase separation inks of the present disclosure. FIG. 1 is a photomicrograph showing a cross-sectional print of a printed image prepared with a currently available ink (Xerox® Part Number 108R00749) showing no ink penetration into paper top coat or paper substrate (left picture) versus a printed image prepared with the ink of Example 3 in accordance with the present disclosure (right picture). The left and right images were printed onto Xerox® Digital Color Elite Gloss paper, 120 gsm (DCEG) using the printing process of commonly assigned, co-pending U.S. patent application Ser. No. 13/095,038, incorporated by reference herein in its entirety. The ink of Example 3 and the comparative ink were separately loaded into a modified Xerox® 860 printer. Each ink was melted at 115° C. and jetted on to the DCEG glossy paper at 55° C. The paper with jetted ink was transported to a second modified Xerox® 8860 for a spreading process. The printer applied pressure of 800 pounds per square inch at an elevated temperature of 57.5° C. on the ink image at a speed of 1 letter-size paper per second. FIG. 1 shows the comparative ink (left) sitting on the paper surface while the present oxazoline ink of Example 3 (right) exhibits the properties of the present disclosure including penetration into the paper coating layer.

Figure 2:
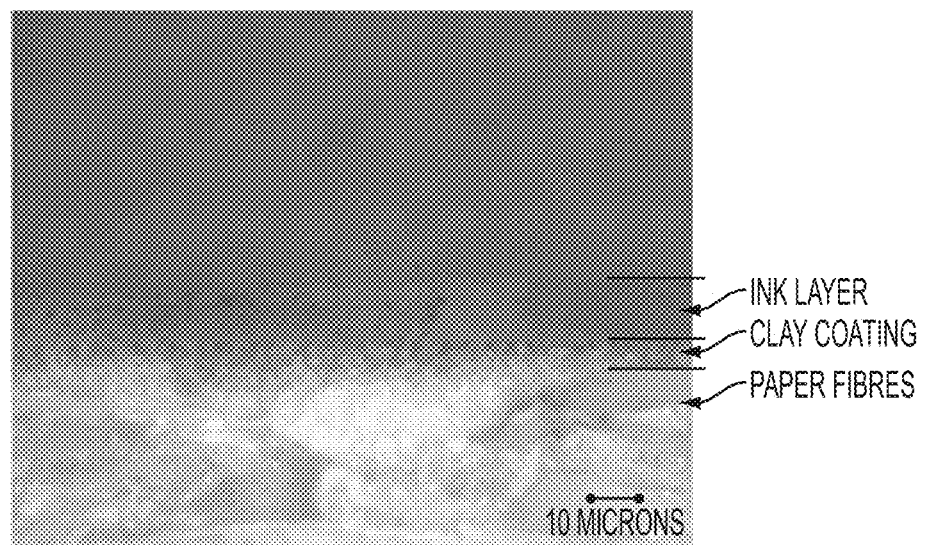
FIG. 2 is a photomicrograph showing a cross-section of a print in accordance with an embodiment of the present disclosure.

FIG. 2 is a photomicrograph showing a cross-section of a printed image prepared with the ink of Example 5 containing a citrate ester and a crystalline component in accordance with an embodiment of the present disclosure. A colored ink image was prepared by incorporating 3 weight % of Orasol Blue GN into the ink vehicle of Example 5b (ink formulation: Amorphous/Crystalline/Dye=1.16/2.72/0.12 (grams)=29.1/67.9/3 (wt %)) with stiffing at 120° C. and printing. The colored ink of Example 5 was loaded into a modified Xerox® 8860 printer, melted at 115° C. and jetted on to the DCEG glossy paper at 55° C. The paper with jetted ink was transported to a second modified Xerox® 8860 for a spreading process. The printer applied pressure of 800 pounds per square inch at an elevated temperature of 57.5° C. on the ink image at a speed of 1 letter-size paper per second.

Figure 3:
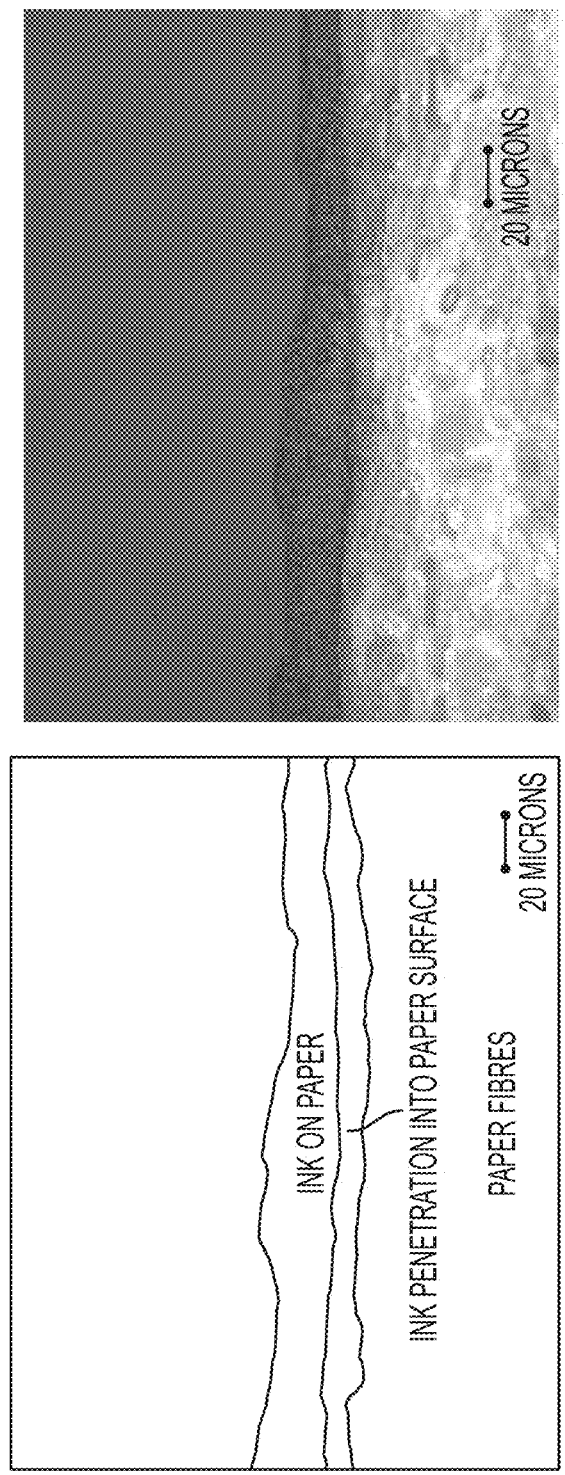
FIG. 3 a drawing (left illustration) and a micrograph (right picture) of a printed ink printed in accordance with the present disclosure.

FIG. 3 provides a schematic illustration (left picture of FIG. 3) and a micrograph (right picture of FIG. 3) showing the ink of Example 3 as a cross-sectional image after printing by the present process. The cross-sectional micrograph of FIG. 3, as with all of the micrographs described herein, were taken using an Axialplan optical microscope available from Carl Zeiss, Inc. The schematic illustration is intended as a guide for the eye as the micrograph on the right is examined and shows the penetration of the ink into the paper coating layer.

Figure 4:
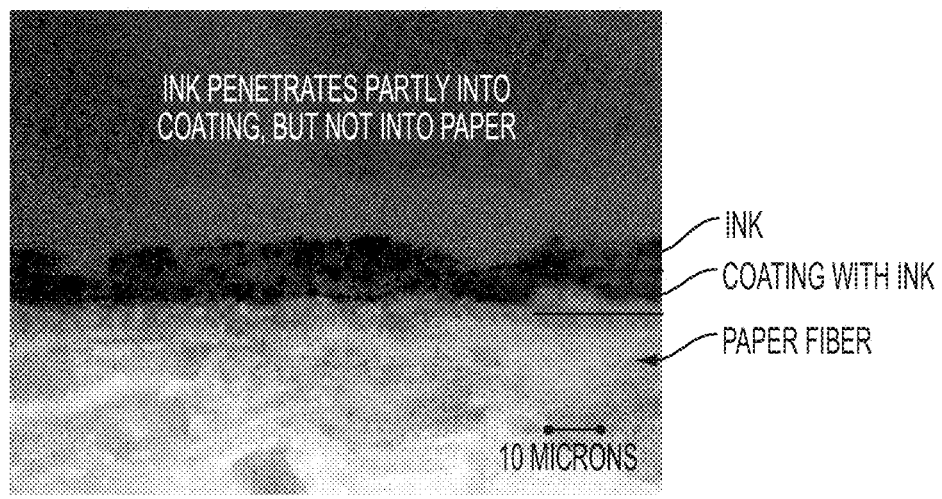
FIG. 4 is a photomicrograph showing ink penetration partly into paper top coat but not into paper substrate in accordance the present disclosure.

FIG. 4 is a photomicrograph of a printed image prepared with the ink of Example 3b, printed in the same manner as described above. FIG. 4 shows ink penetration partly into the paper top coat but not into the paper substrate.

Figure 5:
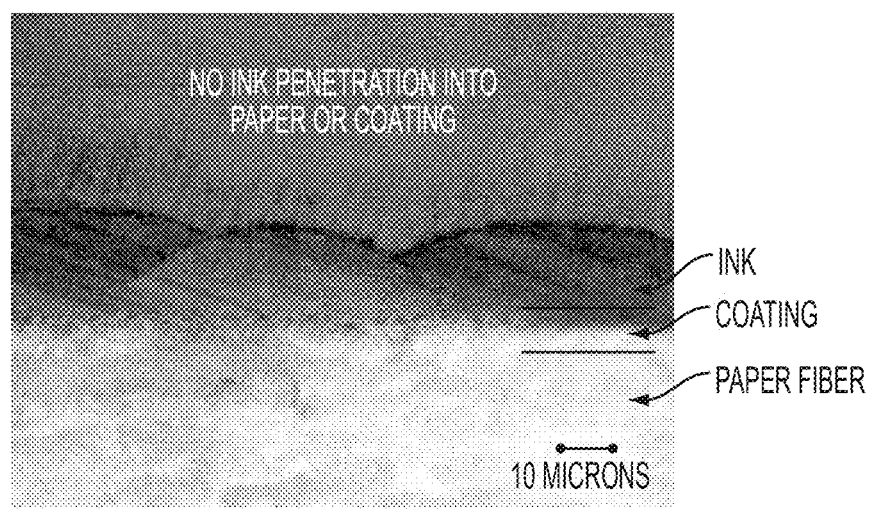
FIG. 5 is a photomicrograph showing no ink penetration into paper top coat or paper substrate in accordance with a comparative print process.

FIG. 5 is a photomicrograph of a printed image prepared with a currently available ink (Xerox® Part Number 108R00749) showing no ink penetration into paper top coat or paper substrate.

FIG. 6 is a graph showing complex viscosity (y-axis, centipoise) versus temperature (x-axis, ° C.) for a comparative ink (Xerox® Part Number 108R00749) and for ink Examples 3a and 3b in accordance with the present disclosure.

FIG. 7 is a graph showing complex viscosity (y-axis, centipoise) versus temperature (x-axis, ° C.) for five ink samples of the ink of Example 5, Examples 5a, 5b, 5c, 5d, 5e, having the amorphous:crystalline ratios as set forth in Table 6.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase separation ink comprising:
   at least one crystallizable component comprising a material that crystallizes as it cools from a first ink jetting temperature to a second temperature that is lower than the ink jetting temperature, wherein the second temperature is sufficient to initiate crystallization of the at least one crystallizable component;
   at least one amorphous component comprising a material that remains amorphous at the second temperature; and
   an optional colorant;
   wherein the at least one crystallizable component and the at least one amorphous component are in a molten, single phase state at the first ink jetting temperature;
   wherein at the second temperature, the phase separation ink comprises a crystalline phase comprising the at least one crystallizable component and an amorphous phase comprising the at least one amorphous component;

wherein the at least one crystallizable component is diphenethyl L-tartrate and the at least one amorphous component is di-L methyl L-tartrate; or wherein the at least one crystallizable component is Bis(4-methoxyphenyl) octanedioate and the at least one amorphous component is tri-DL-menthyl citrate.

2. The phase separation ink of claim 1, wherein the at least one crystallizable component and the at least one amorphous component are in a molten, single phase state at the first ink jetting temperature, and wherein the first ink jetting temperature is from 100° C. to 140° C.

3. The phase separation ink of claim 1, wherein at the second temperature, the phase separation ink comprises a crystalline phase and an amorphous phase, and wherein the second temperature is from 60° C. to 120° C.

4. The phase separation ink of claim 1, wherein amorphous phase of the phase separation ink penetrates into the final image receiving substrate to a maximum depth of 10 micrometers.

5. The phase separation ink of claim 4, wherein the crystalline phase of the at least one phase separation ink provides a protective coating on the surface of the final image receiving subtrate.

6. The phase separation ink of claim 1, wherein the final image receiving substrate comprises a base layer, a top coat layer disposed over a first surface of the base layer; and, optionally, a bottom coat layer disposed over a second, opposite surface of the base layer; and wherein the amorphous phase of the phase separation ink penetrates into the top coat layer of the final image receiving substrate to a maximum depth of 10 micrometers.

7. The phase separation ink of claim 6, wherein the base layer comprises paper.

8. The phase separation ink of claim 1, wherein the colorant displays a greater affinity for the amorphous phase than for the crystalline phase.

9. The phase separation ink of claim 1, wherein the at least one crystallizable component comprises a material having a recrystallization temperature of from 30° C. to 135° C.

10. The phase separation ink of claim 1, wherein the at least one crystallizable component comprises a material having a viscosity of 2 to 50 centipoise at a temperature of 140° C.

11. The phase separation ink of claim 1, wherein the at least one crystallizable component has a melt temperature of from 40° C. to 150° C.

12. The phase separation ink of claim 1, wherein the at least one amorphous component comprises a material having a viscosity of 10 to 500 centipoise at a temperature of 140° C.

13. The phase separation ink of claim 1, wherein the at least one amorphous component comprises a material having a viscosity of greater than $10^5$ centipoise at a temperature of from 30° C. to less than 120° C.

14. The phase separation ink of claim 1, wherein the at least one amorphous component has a glass transition temperature of from −5° C. to 50° C.

15. The phase separation ink of claim 1, wherein the at least one amorphous component has a molecular weight of from 100 to 1000 g/mol.

16. The phase separation ink of claim 1, wherein the difference in viscosity between that at least one crystallizable component and the at least one amorphous component is at least 500 centipoise at a temperature of 30° C.

17. The phase separation ink of claim 1, wherein the ratio in weight percent of crystallizable component to amorphous component is from 60:40 to 95:5 percent by weight, based upon the total combined weight of the crystalline and amorphous components.

18. A process which comprises:
(1) incorporating into an ink jet printing apparatus a phase change ink comprising at least one crystallizable component comprising a material that crystallizes as it cools from a first ink jetting temperature to a second temperature that is lower than the ink jetting temperature, wherein the second temperature is sufficient to initiate crystallization of the at least one crystallizable component; at least one amorphous component comprising a material that remains amorphous at the second temperature; and an optional colorant; wherein the at least one crystallizable component and the at least one amorphous component are in a molten, single phase state at the first ink jetting temperature; wherein at the second temperature, the phase separation ink comprises a crystalline phase comprising the at least one crystallizable component and an amorphous phase comprising the at least one amorphous component;

wherein the at least one crystallizable component is diphenethyl L-tartrate and the at least one amorphous component is di-L methyl L-tartrate; or wherein the at least one crystallizable component is Bis(4-methoxyphenyl) octanedioate and the at least one amorphous component is tri-DL-menthyl citrate;

(2) melting the ink;
(3) causing droplets of the melted ink to be ejected in an imagewise pattern onto an intermediate transfer member or directly onto the final image receiving substrate; and
(4) optionally, if an intermediate transfer member is used, transferring the image to the final image receiving substrate.

* * * * *